US006905798B2

(12) United States Patent
Tsukuda et al.

(10) Patent No.: US 6,905,798 B2
(45) Date of Patent: Jun. 14, 2005

(54) SEPARATOR FOR ELECTROCHEMICAL DEVICE AND METHOD FOR PRODUCING THE SAME

(75) Inventors: Takahiro Tsukuda, Tokyo (JP); Masatoshi Midorikawa, Tokyo (JP); Mitsuo Yoshida, Tokyo (JP); Toshihiro Shigematsu, Tokyo (JP); Kazuchiyo Takaoka, Tokyo (JP); Kenji Hyodo, Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 203 days.

(21) Appl. No.: 10/296,852

(22) PCT Filed: May 29, 2001

(86) PCT No.: PCT/JP01/04492

§ 371 (c)(1), (2), (4) Date: Nov. 27, 2002

(87) PCT Pub. No.: WO01/93350

PCT Pub. Date: Jun. 13, 2001

(65) Prior Publication Data

US 2003/0180622 A1 Sep. 25, 2003

(30) Foreign Application Priority Data

| | | |
|---|---|---|
| May 29, 2000 | (JP) | 2000-157743 |
| May 29, 2000 | (JP) | 2000-157744 |
| Jun. 22, 2000 | (JP) | 2000-187368 |
| Jun. 22, 2000 | (JP) | 2000-187369 |
| Nov. 10, 2000 | (JP) | 2000-342915 |
| Nov. 13, 2000 | (JP) | 2000-344646 |
| Dec. 27, 2000 | (JP) | 2000-396406 |
| Dec. 27, 2000 | (JP) | 2000-396407 |
| Apr. 27, 2001 | (JP) | 2001-130643 |
| May 9, 2001 | (JP) | 2001-138272 |

(51) Int. Cl.[7] .......... H01M 2/16

(52) U.S. Cl. .......... 429/249; 429/142; 429/246; 429/247; 429/253

(58) Field of Search .......... 429/142, 246, 429/247, 249, 253

(56) References Cited

U.S. PATENT DOCUMENTS 5,366,832 A * 11/1994 Hayashi et al. .......... 429/249

FOREIGN PATENT DOCUMENTS

| | | |
|---|---|---|
| EP | 898316 | 2/1998 |
| EP | 834936 | 4/1998 |
| JP | 6-153324 | 6/1994 |
| JP | 9-31817 | 2/1997 |
| JP | 9-63560 | 3/1997 |
| JP | 10-64504 | 3/1998 |
| JP | 11-54101 | 2/1999 |
| JP | 2000-48792 | 2/2000 |
| JP | 2000-299098 | 10/2000 |
| JP | 2001-35754 | 2/2001 |
| JP | 2001-185455 | 7/2001 |

OTHER PUBLICATIONS

JIS P 8117, Japanese Industrial Standard, "Paper and Board . . . Gurley method", 1998.

Toyobo Co., Ltd., Osaka, Japan, "ZYLON", Technical Data, 1998.

ASTM–F316–80, "Standard Test Method for Pore Size . . . Aerospace Fluids", 1980.

* cited by examiner

*Primary Examiner*—Hoa Van Le
(74) *Attorney, Agent, or Firm*—Paul E. White, Jr.; Manelli Denison & Selter PLLC

(57) ABSTRACT

The present invention provide a separator for an electrochemical device which comprises a wet nonwoven fabric comprising one or more kinds of fibrillated organic fibers which are at least partially fibrillated into a fiber diameter of 1 $\mu$m or less, and one or more kinds of unfibrillated organic fibers having a fineness of 0.5 dtex or less, which exhibits excellent heat resistance, electrolyte holding properties, internal short-circuit preventing property, and winding property, which results in a lowered internal resistance and prolonged life of an electrochemical device, and a method for producing the same and an electrochemical device.

20 Claims, No Drawings

SEPARATOR FOR ELECTROCHEMICAL DEVICE AND METHOD FOR PRODUCING THE SAME

FIELD OF THE INVENTION

The present invention relates to a separator for electrochemical device, which has excellent heat resistance, excellent electrolyte holding properties and excellent internal short-circuit preventing properties as well as excellent winding properties, and which can lower the internal resistance of an electrochemical device and prolong the life of the device, and a method for producing the separator. In the present invention, the electrochemical device means, for example, a primary battery, a secondary battery, an electrolytic capacitor, and an electrical double layer capacitor (also referred to as electrical double layer condenser). The electrolyte used in these electrochemical devices may be any of an aqueous electrolyte and an organic electrolyte.

BACKGROUND ART

One of the most important properties for a separator used in electrochemical devices such as a variety of batteries and an electrical double layer capacitor, includes electrolyte holding properties. An electrochemical device comprising a separator having poor electrolyte holding properties has an increased internal resistance, so that the device encounters problems of a lack of the capacity, lowering of the voltage, and shortening of the life. As a separator for lithium primary or secondary battery, for example, Japanese Prov. Patent Publication No. 105851/1991 discloses "a separator for lithium battery, comprising a microporous film formed from a polyethylene composition which comprises 1% by weight or more of ultra-high molecular weight polyethylene having a weight average molecular weight of $7\times10^5$ or more, and which has a ratio of weight average molecular weight to number average molecular weight of 10 to 300, wherein the microporous film has a thickness of 0.1 to 25 $\mu$m, a void rate of 40 to 95%, an average through-hole diameter of 0.001 to 0.1 $\mu$m, and a breaking strength of 0.5 kg or more as measured with respect to a 10-mm width specimen".

However, a separator of this type has a pore diameter as extremely small as submicron or less, and therefore, when an electrolyte has a high viscosity, the electrolyte is difficult to penetrate the separator, resulting in a poor battery-assembly efficiency. In addition, in this separator, the pores are linearly formed in the Z direction. Therefore, the electrolyte holding capacity of the separator is more or less lowered, and the electrodes gradually swell while repeating charge-discharge operations and the separator is pressed by the swelled electrodes to cause the electrolyte to ooze from the separator, gradually lowering the capacity of the device.

For solving the problem, it has been recently proposed to use nonwoven fabric having excellent gas permeability as a separator. In nonwoven fabric, individual fibers are relatively randomly stacked on and adhere to one another in the Z direction of the fabric. Therefore, the pores formed in the nonwoven fabric are not linear and thus the nonwoven fabric advantageously has excellent electrolyte holding properties. However, pinholes are likely to be formed in thinner nonwoven fabric, and dry nonwoven fabric especially has disadvantages in that the electrolyte holding properties are rather unsatisfactory and uniform thickness is difficult to obtain. As a method for solving the problems, a way of employing wet paper making using fibrillated or microfibrillated fibers is effective.

For example, in Japanese Prov. Patent Publication No. 27311/1997, the present inventors have disclosed "nonwoven fabric for a battery separator, comprising organic fibers which are at least partially fibrillated into a fiber diameter of 1 $\mu$m or less and having a gas permeability of 100 mmHg or more", in view of providing nonwoven fabric for a battery separator, which has excellent gas permeability and excellent electrolyte holding properties and which suffers no formation of pinholes and can prevent internal short-circuit.

In electrochemical devices, such as a primary battery, a secondary battery, an electrolytic capacitor, and an electrical double layer capacitor using an organic electrolyte or a nonaqueous gel electrolyte as an electrolyte or a gel electrolyte, a slight amount of moisture contained in the system of the device leads to problems of lowering of the capacity and shortening of the life of the device. Therefore, greatest possible care is taken so that no moisture is contained in the device.

Specifically, in the production process of electrochemical devices, electrodes and a separator are generally dried at a high temperature or dried in vacuum at a high temperature after laminating and winding together, to remove the moisture contained in the electrodes and separator. For example, with respect to the electrical double layer capacitor, drying temperature is generally 150° C. or higher, and recent trend is to elevate the drying temperature to as high as 180° C. or 200° C., for improving drying efficiency, and hence a separator having excellent heat resistance is desired.

For example, Japanese Prov. Patent Publication No. 68380/2001 discloses "a separator for electrical double layer capacitor using an aqueous electrolyte and comprising a separator disposed between a pair of polarizable electrodes, wherein the separator comprises nonwoven or woven fabric comprised mainly of sulfonated polyolefin fibers". When this separator is exposed to a temperature of 150° C. or higher for a long period of time, the polyolefin fibers in the separator melt, so that the separator cannot maintain its form. Thus, the separator does not have sufficient heat resistance, which is one of the objectives that we intend to attain.

Japanese Prov. Patent Publication No. 45586/1997 discloses "an electrical double layer capacitor comprising a pair of polarizable electrodes, a separator disposed between the polarizable electrodes, and an electrolyte, wherein the polarizable electrodes and the separator are impregnated with the electrolyte, wherein solvent-spun rayon and sisal pulp which is natural fiber are used as raw materials for the separator and subjected to paper making to produce the separator", and it is clearly described that, when the separator does not contain 30% or more of the solvent-spun cellulose fibers and 40% or more of the sisal pulp, excellent electrical properties of the capacitor cannot be obtained. Japanese Prov. Patent Publication No. 3834/2000 discloses "an electrolytic capacitor comprising a separator disposed between a pair of polarizable electrodes, wherein the separator is produced by paper making using, as a raw material for the separator, 60 to 100% by weight of a beat material comprising beatable solvent-spun cellulose".

When a separator of paper type comprising the above-mentioned blend of rayon (cellulose fibers) and pulp or solvent-spun cellulose fibers is dried at a temperature as high as 180° C. or 200° C. for a long period of time, the separator suffers deterioration by carbonization. Therefore, the separator must be dried at a low temperature of about 150° C. for as long as about one day, thereby lowering the production efficiency of electrochemical devices. Further, when the separator which has been dried at a high temperature is allowed to stand in an ambient atmosphere, the separator absorbs moisture and returns in a short time to a state before drying. Therefore, the separator has another problem that an electrochemical device comprising the separator is likely to suffer lowering of the capacity and shortening of the life. Thus, the above separators do not have sufficient heat resistance, which is one of the objectives that we intend to attain.

In the production process for electrochemical devices, when electrodes and a separator are wound together, a high tension may be applied to the separator depending on the type of the winding machine used, causing the separator to be broken. Further, depending on the electrodes, the fin of the electrode base material may penetrate and puncture the separator. For this reason, the separator is required to have sufficient tensile strength and puncture strength.

For example, Japanese Patent No. 2965335 discloses "an electrolytic capacitor comprising a separator disposed between an anode foil and a cathode foil, wherein the separator is a separator for electrolytic capacitor, comprising mixed nonwoven fabric comprising glass fiber, and heat resistant organic polymer fibers having a glass transition temperature of 130° C. or higher and having a welding property at a melting point or glass transition temperature thereof or higher". Glass fiber has no binding ability, and therefore, in this separator for electrolytic capacitor, the heat resistant organic polymer fibers are used as a binder such that they are fused by heat to other fibers. On the other hand, the wet nonwoven fabric in the present invention comprises liquid crystalline polymer fibers having a melting point or a heat decomposition temperature of 250° C. or higher, but the separator is not subjected to thermal treatment at a temperature at which the fibers melt, which means the fibers are not positively fused melt and fused to other fibers.

Like the separator for electrolytic capacitor disclosed in the above patent document, when the separator solely comprises glass fiber and heat resistant organic polymer fibers which are used as a binder to be fused by heat, it is difficult to fuse the polymer fibers by heat only at contact points between the glass fibers and the heat resistant organic polymer fibers or contact points between the heat resistant organic polymer fibers themselves. Instead, the whole of the heat resistant organic polymer fibers are likely to be melted to form a film. Even if the heat resistant organic polymer fibers can be fused only at contact points between the fibers, in the region having a high density of the heat resistant organic polymer fibers, the organic polymer fibers are likely to be fused by heat to form a film, leading to problems that the formation and thickness distribution of the resultant mixed nonwoven fabric are not uniform, and that the electrolyte holding properties of the separator become poor. All the mixed nonwoven fabric described in the working examples of the above patent document has a glass fiber content of 40% or more. Therefore, when a separator comprising such nonwoven fabric is bent, the separator is likely to be broken at the bending portion, and hence it poses a problem of winding properties.

Japanese Prov. Patent Publication No. 40131/1999 discloses "a battery separator comprising a sheet prepared by mixing and shaping a stock comprising at least thermoplastic polymer pulp having a melting point of 200° C. or lower and an organic compound having substantially no stable melting temperature". As can seen in the working examples, when this battery separator is exposed to a temperature of 120° C. or higher for a period of time as short as three minutes, the thermoplastic polymer pulp is melted to form a film, so that the pores in the separator are blocked to lower the gas permeability. When the separator having such properties is dried, together with electrodes, at a temperature as high as 150° C. or higher, 180° C. or higher, or 200° C. or higher, for a long period of time, the gas permeability of the separator is lowered, markedly increasing the internal resistance of the electrochemical device is, thereby considerably lowering the function of the electrochemical device. Therefore, the separator does not have sufficient heat resistance, which is one of the objectives that we intend to attain.

Japanese Prov. Patent Publication No. 321785/1998 discloses "a separator for alkaline battery, comprising 5 to 80% by weight of paraaramid fibers having a freeness of 400 ml or less, as all of or part of the synthetic fiber component, and 20 to 60% by weight of a cellulose fiber component, based on the total weight of the fibers, which has a center line average surface roughness of less than 10 μm, a maximum pore diameter of 35 μm or less, and an average pore diameter of 5 to 20 μm". Such a separator comprising 20% or more of a cellulose component has high moisture absorption, and therefore has a low drying efficiency, and, when this separator is dried at a higher temperature, it suffers deterioration by carbonization. Therefore, the separator does not have sufficient heat resistance, which is one of the objectives that we intend to attain. Further, the separator having a maximum pore diameter of 35 μm and an average pore diameter of 5 to 20 μm is not appropriate at all as a separator for electrochemical device having an electrode comprising an active material having an average particle diameter of about several μm. Thus, the separator does not have sufficient internal short-circuit preventing properties, which are one of the objectives that we intend to attain.

Japanese Prov. Patent Publication No. 35754/2001 discloses "a separator for electrical double layer capacitor using sulfuric acid as an electrolyte and comprising a pair of polarizable electrodes, and a separator disposed between the electrodes, wherein the separator comprises wet nonwoven fabric comprised mainly of acid resistant single fibers and acid resistant fibrillated fibers, and wherein the separator has a thickness of 300 μm or less, a void rate of 40 to 90%, and a liquid holding rate of 200% by weight or more, based on the weight of the separator, as measured by 40% sulfuric acid impregnation". That is, disclosed is a separator for electrical double layer capacitor, which is exclusively used in an electrical double layer capacitor wherein the electrolyte is sulfuric acid and the electrodes are a pair of polarizable electrodes. This separator is improved mainly in the sulfuric acid holding rate by using acid resistant fibers, and an improvement of the heat resistance which is one of the objectives of the present invention is not taken into consideration at all. In fact, in the working examples of the above patent document, a separator for electrical double layer capacitor comprising 100% of acrylic fibers and a separator comprising 100% of polyolefin fibers are exemplified, irrespective of fiber forms, and these separators do not have sufficient heat resistance, which is one of the objectives of the present invention.

The present invention has been made for solving the above-mentioned problems accompanying conventional techniques. Specifically, an object of the present invention is to provide a separator for electrochemical device, which has excellent heat resistance, excellent electrolyte holding properties and excellent internal short-circuit preventing properties as well as excellent winding properties, and which can lower the internal resistance of an electrochemical device and prolong the life of the device, and a method for producing the separator and an electrochemical device.

SUMMARY OF THE INVENTION

The present inventors have carried out extensive and intensive studies with a view toward solving the above-mentioned problems, regarding the kinds of fibrillated organic fibers and unfibrillated organic fibers. As a result, it has been found that a separator for electrochemical device can be obtained, which has excellent uniformity of texture and thickness, excellent heat resistance, excellent electrolyte holding properties, excellent internal short-circuit preventing properties as well as excellent winding properties, and lowers internal resistance of an electrochemical device and prolongs the life of the device, and thus the present invention has been completed.

Specifically, the present invention relates to descriptions corresponding to the presently amended claim 1.

BEST MODE FOR CARRYING OUT THE INVENTION

Hereinbelow, the separator for electrochemical device and the method for producing the same of the present invention will be described in detail.

In the present invention, the electrochemical device means, for example, a manganese dry cell battery, an alkaline manganese battery, a silver oxide battery, a lithium battery, a lead storage battery, a nickel-cadmium storage battery, a nickel-hydrogen storage battery, a nickel-zinc storage battery, a silver oxide-zinc storage battery, a lithium ion battery, a lithium polymer battery, various gel electrolyte batteries, a zinc-air storage battery, an iron-air storage battery, an aluminum-air storage battery, a fuel cell, a solar battery, a sodium-sulfur battery, a polyacene battery, an electrolytic capacitor, and an electrical double layer capacitor (also referred to as electrical double layer condenser). The electrodes used in the electrical double layer capacitor may be either a pair of polarizable electrodes or a combination of a polarizable electrode and a nonpolarizable electrode.

The separator for electrochemical device of the present invention comprises at least one kind of organic fibers which are at least partially fibrillated into a fiber diameter of 1 $\mu$m or less. Here, the wording "at least one kind" is used in respect of either the kind of organic fibers or the degree of fibrillation of the organic fibers. Specifically, "at least one kind of organic fibers" include one kind or two or more kinds of organic fibers irrespective of the degree of fibrillation, and one kind of organic fibers which are fibrillated at different degrees.

In the present invention, the fibrillated organic fibers mean organic fibers treated using at least a high-pressure homogenizer so as to have a fiber form having a portion extremely finely divided mainly in the direction parallel to the fiber axis. The wording "using at least a high-pressure homogenizer" means either to solely use a high-pressure homogenizer or to use a high-pressure homogenizer in combination with another apparatus, for example, a refiner, a beater, or an attritor in combination. The organic fibers fibrillated using a high-pressure homogenizer have a feature that the fiber diameter distribution is relatively narrow and that the fiber diameter is highly uniform.

In the present invention, the organic fibers which are finely divided without using a high-pressure homogenizer but using, for example, a refiner, a beater, or an attritor solely or in combination thereof are defined as pulp, and distinguished from the fibrillated organic fibers. Further, the fibrillated organic fibers in the present invention are different from fibrid. As described in U.S. Pat. Nos. 5,833,807 and 5,026,456, fibrid is not fibers but a film-form particle having an average length of 0.2 to 1 mm and a length-to-width ratio i.e., aspect ratio of 5:1 to 10:1. The fibrillated organic fibers of the preset invention may have a fiber diameter of 1 $\mu$m or less in at least part, namely, in a finely divided portions thereof. The standard for degree of fibrillation of the organic fibers is an aspect ratio in terms of length-to-width ratio of 20:1 to 50,000:1 and a Canadian standard freeness of 0 to 500 ml.

In the present invention, the high-pressure homogenizer is an apparatus which can finely divide an object by means of a shear force caused by passing the object through an orifice under a pressure of at least 10 kg/cm$^2$ or more, preferably 200 to 1,000 kg/cm$^2$, further preferably 400 to 1,000 kg/cm$^2$, and rapidly reducing the pressure and the rate. The shear force is exerted on the organic fibers so that the fibers are torn and untwisted mainly in the direction parallel to the fiber axis, and then the organic fibers are gradually fibrillated. Specifically, organic fibers cut into a fiber length of 5 mm or less, preferably 3 mm or less are used as a raw material, and dispersed in water to give a suspension. The suspension has a concentration of up to 25% by mass, preferably 1 to 10% by mass, further preferably 1 to 2% by mass. The suspension is introduced into a high-pressure homogenizer, and a pressure of at least 10 kg/cm$^2$, preferably 200 to 1,000 kg/cm$^2$, further preferably 400 to 1,000 kg/cm$^2$ is applied to the suspension, and a sequence of this operation of passing the suspension through the high-pressure homogenizer is repeated several to several tens times. If desired, a chemical such as a surfactant may be added to the suspension being treated.

In the present invention, the refiner means a refiner which is generally used in preparation of pulp, for example, a single-disk refiner and a double-disk refiner. Organic fibers are dispersed in water to prepare a suspension, and the suspension is repeatedly treated several to several tens times by, changing the frequency of treatment, the clearance, or the concentration to achieve a desired average fiber length and a desired degree of pulping. If desired, a chemical such as a surfactant and a thickener may be added to the suspension being treated.

In the present invention, the beater means a beater which is generally used in preparation of pulp. Organic fibers are dispersed in water, and the resultant dispersion is allowed to flow and repeatedly pass between a fixed blade and a rotary blade so that the organic fibers are beaten and gradually pulped.

In the present invention, the attritor is an apparatus utilizing the principle of a stone mill. Organic fibers are dispersed in water, and the resultant dispersion is introduced to a rotating attritor disk made of metallic particles or ceramic particles so that the fibers are milled and pulped.

In the present invention, it is preferred that the fibrillated organic fibers have an average fiber length of 0.3 to 2 mm. When the fibrillated organic fibers have an average fiber length of less than 0.3 mm, individual fibers hardly entangle one another, so that they are likely to be fallen off from the resultant wet nonwoven fabric. On the other hand, when the fibrillated organic fibers have an average fiber length of more than 2 mm, the degree of fibrillation for the fibers is unlikely to be uniform. As a method for preparing organic fibers which have an average fiber length of 0.3 to 2 mm and which are at least partially fibrillated into a fiber diameter of 1 μm or less, a method is preferred in which organic fibers are subjected to pretreatment using a refiner, followed by treatment using a high-pressure homogenizer.

In the present invention, examples of kinds of fibrillated organic fibers include natural cellulose fibers, solvent-spun cellulose fibers, and single fibers and conjugate fibers, each comprising a resin, such as acryl, polyolefin, polyester, polyamide, polyimide, polyamideimide, totally aromatic polyamide (aramid), totally aromatic polyester (polyarylate), polyether ether ketone (PEEK), polyether sulfone (PES), polyphenylene sulfide (PPS), fluororesins, polyvinyl alcohol, ethylene-vinyl alcohol copolymers, totally aromatic polyester amide, totally aromatic polyether, totally aromatic polycarbonate, totally aromatic polyazomethine, and poly-p-phenylene benzobisthiazole (PBZT). In addition, the fibrillated organic fibers may be such that are obtained by dividing conjugate fibers comprising different kinds of two or more of the above fibers.

In the present invention, it is preferred that part of or all of the fibrillated organic fibers comprises liquid crystalline polymer fibers having a melting point or a heat decomposition temperature of 250° C. or higher. The liquid crystalline polymer fibers are preferred since they are readily finely fibrillated into a uniform fiber diameter, as compared to other organic fibers.

In the present invention, the liquid crystalline polymer means a polymer which exhibits crystalline properties while exhibiting fluidity when being melted or dissolved in a solvent. Specifically, the former, i.e., a melting liquid crystal-type polymer is a polymer which exhibits a liquid crystal behavior when being melted at high temperatures, and the latter, i.e., a dissolution liquid crystal-type polymer is a polymer which exhibits a liquid crystal behavior when being dissolved in a solvent. A crystalline polymer has a crystalline phase and a noncrystalline phase, whereas a liquid crystalline polymer has a liquid crystalline phase between a crystalline phase and a noncrystalline phase. Therefore, the liquid crystalline polymer is a polymer which belongs to neither a crystalline polymer nor a noncrystalline polymer. Liquid crystalline polymer fibers are fibers prepared by spinning a crystalline polymer in a molten state or a dissolved state in a solvent to form fibers. Liquid crystal exhibits very high fluidity and molecular orientation, i.e., fluid orientation. Therefore, when liquid crystalline polymers pass through a spinning nozzle, remarkable fluid orientation is caused in the polymers, thus giving fibers with a high molecular orientation. By fibrillating the liquid crystalline polymer fibers having such high molecular orientation, fibrillated fibers having a small and uniform fiber diameter and having a relatively narrow fiber diameter distribution can be obtained. Most of synthetic polymer fibers comprise a crystalline polymer, exclusive of polyvinyl alcohol fibers, and the crystalline polymer fibers have low molecular orientation and therefore, it is difficult for them to form into highly uniform fibrillated fibers, as compared with the liquid crystalline polymer fibers.

Examples of the liquid crystalline polymer fibers having a melting point or a heat decomposition temperature of 250° C. or higher in the present invention include single fibers and conjugate fibers, each comprising totally aromatic polyamide (aramid), totally aromatic polyester (polyarylate), totally aromatic polyester amide, totally aromatic polyether, totally aromatic polycarbonate, totally aromatic polyazomethine, polyphenylene sulfide (PPS), or poly-p-phenylene benzobisthiazole (PBZT). Of these, preferred are totally aromatic polyamide (aramid) fibers which are readily uniformly fibrillated and totally aromatic polyester (polyarylate) fibers with an extremely low moisture absorption. Among the totally aromatic polyamide (aramid) fibers, paraaramid fibers are preferred.

Examples of the paraaramid fibers include fibers prepared by spinning poly-p-phenylene terephthalamide, poly-p-benzamide, poly-p-amidehydrazide, or poly-p-phenylene terephthalamide-3,4-diphenyl ether terephthalamide, but they are not limited to these.

The totally aromatic polyester (polyarylate) is synthesized from monomers in combination, such as an aromatic diol, an aromatic dicarboxylic acid, and an aromatic hydroxycarboxylic acid, in various formulations. Examples of the totally aromatic polyesters (polyarylates) include copolymers of p-hydroxybenzoic acid and 2-hydroxy-6-naphthoic acid, but they are not limited to these. The totally aromatic polyester (polyarylate) fibers are prepared by spinning the above polymer to form fibers.

For the purpose of changing degree of fibrillation of the fibrillated organic fibers or liquid crystalline polymer fibers in the present invention, machines of different kinds may be used with a high-pressure homogenizer, or the frequency of the treatment may be changed. In the present invention, the kind of the organic fibers or liquid crystalline polymer fibers and the degree of fibrillation are appropriately selected depending on the various properties required for the final separator for electrochemical device.

It is preferred that the content of the fibrillated organic fibers or liquid crystalline polymer fibers in the separator for electrochemical device of the present invention is 10 to 70%. When the content is less than 10%, the heat resistance of the separator for electrochemical device is likely to be unsatisfactory, and when the content is more than 70%, the freeness of the stock slurry tends to be markedly lowered, which results in poor paper making properties and unfavorable texture of fabric.

The fibrillated organic fibers or liquid crystalline polymer fibers are very thin, therefore, the amount of the fibers is considerably large, and the fibers have a very large aspect ratio. This results in a larger chance for the fibrillated fibers to be entangled each other, or for the fibrillated fibers and other fibers to be entangled each other, thereby to give a dense wet nonwoven fabric having small pores. As a result, a separator for an electrochemical device having excellent electrolyte holding properties and excellent internal short-circuit preventing properties can be obtained. Incidentally, the electrolyte holding properties are generally evaluated in terms of the weight of the electrolyte held by the separator for electrochemical device. When the electrolyte is held in an amount of 150% or more, preferably 190% or more based on the weight of the separator for electrochemical device, the internal resistance becomes small, and excellent properties can be attained. The fibrillated liquid crystalline polymer fibers in the present invention have a melting point or a heat decomposition temperature of 250° C. or higher, and therefore they considerably contribute to heat resistance of the separator for electrochemical device.

The separator for electrochemical device of the present invention comprises of at least one kind of unfibrillated organic fibers having fineness of 0.5 dtex or less. Here, the wording "unfibrillated organic fibers having fineness of 0.5 dtex or less" means so-called chopped fibers having a definite fineness and a definite fiber length. The wording "at least one kind" is used in respect of either the kind of organic fibers or the fineness of the organic fibers. Specifically, "at least one kind of unfibrillated organic fibers" include two or more kinds of organic fibers having the same fineness, one kind of organic fibers having different fineness values, and two or more kinds of organic fibers having different fineness values.

Examples of the unfibrillated organic fibers having fineness of 0.5 dtex or less in the present invention include single fibers and conjugate fibers, each comprising a resin, such as acryl, polyolefin, polyester, polyamide, polyimide, polyamideimide, totally aromatic polyamide (aramid), totally aromatic polyester (polyarylate), polyether ether ketone (PEEK), polyether sulfone (PES), polyphenylene sulfide (PPS), a fluororesin, polyvinyl alcohol, and an ethylene-vinyl alcohol copolymer. In addition, the unfibrillated organic fibers may be obtained by dividing conjugate fibers comprising different kinds of two or more of the above fibers.

In the present invention, it is preferred that at least part of the unfibrillated organic fibers comprises a component having a melting point or a heat decomposition temperature of 200° C. or higher. The reason for this is that, by having a component with a melting point or a heat decomposition temperature of 200° C. or higher, even when the organic fibers are heated to about 200° C., they are not completely melted or do not markedly shrink by heat, so that no problem relating heat resistance of the separator for electrochemical device occurs. Examples of such organic fibers include single fibers and conjugate fibers, each comprising a resin, such as acryl, polyester, polyamide, polyimide, polyamideimide, totally aromatic polyamide (aramid), totally aromatic polyester (polyarylate), polyether ether ketone (PEEK), polyether sulfone (PES), polyphenylene sulfide (PPS), a fluororesin, and polyvinyl alcohol, and, of these, especially preferred are polyester fibers and acrylic fibers because they have high resistance not only to aqueous electrolytes but also to organic electrolytes and they can be easily prepared to have a finer fiber diameter.

The unfibrillated organic fibers having fineness of 0.5 dtex or less in the present invention serve to capture the fibrillated organic fibers to effectively make the texture of the separator for electrochemical device uniform. In this case, in view of making the texture of the wet nonwoven fabric more uniform, it is preferred to use the organic fibers of two or more kinds of fineness that is on 0.5 dtex or less. The content of the unfibrillated organic fibers having fineness of 0.5 dtex or less in the separator for electrochemical device of the present invention is preferably 3% or more, more preferably 5% or more.

The separator for electrochemical device of the present invention preferably contains fibrillated cellulose fiber in an amount of 8% or less, more preferably 5% or less. When the content of the fibrillated cellulose fiber is more than 8%, the moisture absorption of the separator for electrochemical device is likely to increase. In the present invention, the fibrillated cellulose fibers are cellulose fibers having an average fiber length of 2 mm or less, preferably 1 mm or less, in which most of individual fibers have a fiber diameter of 1 $\mu$m or less. Preferred are those being capable of forming a film by a self-binding force due to hydrogen bonding.

The fibrillated cellulose fibers in the present invention is produced by finely diving a raw material, such as various pulp including linter, lint, and solvent-spun cellulose, mainly in the direction parallel to the fiber axis using at least a high-pressure homogenizer. The fibrillated cellulose fibers may be fibrillated either by using a high-pressure homogenizer alone, or by a treatment using a high-pressure homogenizer and another apparatus in combination, for example, a refiner, a beater, or an attritor.

The fibrillated cellulose fibers in the present invention entangle with other fibers, and therefore the bonding force between the fibers is enhanced, so that the tensile strength of the separator for electrochemical device is increased. Further, when the fibrillated cellulose fibers form a film due to a self-binding force caused by hydrogen bonding, the resultant separator for electrochemical device hardly suffers formation of pinholes, so that not only an improved effect of preventing an electrode active material from penetrating the separator but also an increased puncture strength of the separator for electrochemical device can be attained.

The separator for electrochemical device of the present invention preferably contains bacterial cellulose in an amount of 8% or less, more preferably 5% or less. In the present invention, the bacterial cellulose means bacterial cellulose that a microorganism produces. The bacterial cellulose includes those comprising cellulose and those comprising cellulose as a primary chain and a hetero-polysaccharide, and those comprising glucans such as β-1,3-glucan or β-1,2-glucan. In case that the bacterial cellulose comprises a hetero-polysaccharide, constituents other than cellulose include hexose or pentose such as mannose, fructose, galactose, xylose, arabinose, rhamnose, or glucuronic acid, and an organic acid. These polysaccharides may be constituted by either a single substance or two or more polysaccharides which are bonded through hydrogen bonding or the like, and any polysaccharides can be utilized.

As a microorganism capable of producing the bacterial cellulose in the present invention, there can be used *Acetobacter aceti* subsp. *xylinum* ATCC 10821, *A. pasteurian, A. rancens, Sarcina ventriculi, Bacterium xyloides, Pseudomonas* bacteria, and *Agrobacterium* bacteria, which are capable of producing bacterial cellulose, however, the microorganism is not limited to these.

A method for culturing these microorganisms to produce and accumulate bacterial cellulose can be carried out in accordance with a general method of culturing bacteria. Specifically, microorganisms are inoculated in a general nutrient culture containing a carbon source, a nitrogen source, an inorganic salt, and if necessary, an organic trace nutrient such as an amino acid or a vitamin, and then, they are allowed to stand still or stirred under mild ventilation.

The bacterial cellulose produced and accumulated is disintegrated to form an aqueous slurry. The disintegration is easily achieved by using a rotary-type disintegration machine or a mixer. The thus obtained bacterial cellulose disintegration product has a very strong binding ability with fibers, as compared with the other cellulose fibers. Therefore, by adding only a small amount of the bacterial cellulose disintegration product to organic fibers or inorganic fibers, wet nonwoven fabric having a high strength can be obtained.

The separator for electrochemical device of the present invention preferably comprises microglass fiber having an average fiber diameter of 3 $\mu$m or less, especially preferably 1 $\mu$m or less. When the separator contains microglass fiber, the separator is improved in the dimensional stability against heat, so that the void rate of the separator is less reduced, to effectively secure excellent electrolyte holding properties. At the same time, heat shrinkage of the separator for electrochemical device is reduced, so that short-circuit between electrodes is prevented, to effectively improve the yield of production of the electrochemical device. Further, the microglass fiber has a high affinity with both an aqueous electrolyte and an organic electrolyte. Therefore, the microglass fiber has an effect of improving the electrolyte holding properties of the separator and lowering the internal resistance of the separator for electrochemical device. When the average fiber diameter of microglass fiber exceeds 3 μm, the microglass fiber is easily broken and fallen off from the separator upon abrasion or secondary processing of the separator for electrochemical device, causing a problem of forming pinholes.

In the present invention, the microglass fiber is extremely thin glass fiber which is produced by a steam spraying process, a spinning process, a flaming process, or a rotary process, whose average fiber diameter is generally 5 μm or less.

The content of the microglass fiber in the separator for electrochemical device of the present invention is preferably 20% or less, more preferably 10% or less. When the microglass fiber content exceeds 10%, and especially exceeds 20%, the separator tends to have lowered folding endurance or lowered interlaminar strength, causing a problem in winding property with electrodes.

It is preferred that the separator for electrochemical device of the present invention comprises a core-shell conjugate fibers having fineness of 3 dtex or less in which a core portion comprises a component having a melting point of 200° C. or higher and a shell portion comprises a component having a melting point of lower than 200° C. Examples of the components having a melting point of 200° C. or higher include polyester and polyamide. Of these, polyester is preferred in view of easily obtaining fibers with a small fiber diameter. Examples of the components having a melting point of lower than 200° C. include low melting-temperature polyester, polypropylene and polyethylene.

In the core-shell conjugate fibers comprising a core portion comprising a component having a melting point of 200° C. or higher and a shell portion comprising a component having a melting point of lower than 200° C., the shell portion serves as a binder such that the shell portion is melted and fused to other fibers in a drying step in the wet paper making, to impart a strength to the wet nonwoven fabric, thus improving the tensile strength and puncture strength of the wet nonwoven fabric. In addition, the core portion having a melting point of 200° C. or higher can maintain the fiber form even in a drying step at around 200° C. in the production process for the electrochemical device. Therefore, the heat shrinkage of the wet nonwoven fabric is suppressed, and the void rate of the fabric, which is important to the electrolyte holding properties of the separator, is hardly reduced, causing no problem relating heat resistance.

With respect to the content of the core-shell conjugate fibers in the separator for electrochemical device of the present invention, there is no particular limitation, but the content is preferably 50% or less. When the content exceeds 50%, the pores in the separator are considerably blocked due to fusion of the shell portion, so that the electrolyte holding properties of the separator are likely to be lowered.

With respect to the fiber length of the unfibrillated organic fibers in the present invention, there is no particular limitation, however, in view of easily obtaining a wet nonwoven fabric with uniform texture, the unfibrillated organic fibers preferably have a fiber length of 1 to 30 mm, more preferably 1 to 10 mm. When the fiber length is shorter than 1 mm, the ability of capturing the fibrillated fibers becomes poor, and when the fiber length exceeds 30 mm, the unfibrillated organic fibers are likely to be twisted to one another to cause thickness variation of the wet nonwoven fabric.

It is preferred that the separator for electrochemical device of the present invention has a multilayer structure. By virtue of having a multilayer structure, formation of pinholes can be effectively suppressed.

It is preferred that the separator for electrochemical device of the present invention has a void rate of 65 to 85%. When the separator has a void rate of less than 65%, the electrolyte holding capacity of the separator is lowered, thereby increasing the internal resistance. When the separator has a void rate of more than 85%, the density of the separator for electrochemical device is too low and the pore diameter becomes larger, so that the electrode active material is likely to penetrate the separator for electrochemical device to cause internal short-circuit.

In the present invention, the void rate is determined by making calculation from the specific gravity of the fibers constituting the separator for electrochemical device and the density of the separator for electrochemical device. Specifically, the specific gravity of the separator for electrochemical device is determined from the specific gravity of the fibers constituting the separator for electrochemical device, and a void rate (%) is obtained by dividing the difference between the specific gravity and the density of the separator for electrochemical device by the specific gravity, followed by multiplying by 100. In this case, the density of the separator for electrochemical device is obtained by dividing the basis weight of the separator for electrochemical device by the thickness, and the thickness is measured using a micrometer. In the measurement of the thickness, 10 samples of the separators for electrochemical device are piled on one another and the thickness of the piled samples under a predetermined load is measured, and then a thickness per separator is calculated.

It is preferred that the separator for electrochemical device of the present invention has a multilayer structure comprising relatively higher and lower density layers. The presence of the relatively lower density layer in the separator facilitates absorption of an electrolyte to improve the production efficiency of the electrochemical device.

The separator for electrochemical device of the present invention is preferably subjected to thermal treatment at 150 to 250° C., more preferably at 180 to 250° C. By preliminarily subjecting the separator to thermal treatment at a high temperature, part of the organic fibers constituting the separator for electrochemical device are softened and melted, and fused to other fibers or themselves, thereby improving the separator in dimensional stability against heat. Therefore, even when the separator is subjected to high-temperature drying treatment, together with electrodes, the separator hardly shrinks by heat, so that an accident can be prevented such that electrodes are brought into contact with each other. The thermal treatment improves the separator in tensile strength and puncture strength and therefore, an accident of breakage or penetration of the separator is unlikely to occur while winding the separator and electrodes together, so that the production efficiency and yield of the electrochemical device are improved. It is preferred that the temperature employed for the thermal treatment for the separator is a temperature equal to or higher than the temperature for the high-temperature drying treatment.

The separator for electrochemical device of the present invention is preferably obtained by subjecting the wet nonwoven fabric to thermal treatment so that at least one surface, advantageously both surfaces of the wet nonwoven fabric are brought into contact with a roll heated to 150 to 250° C., more preferably 180 to 250° C. By contacting the wet nonwoven fabric with a heated roll, the entire wet nonwoven fabric thoroughly conducts heat, so that the effect of the thermal treatment is enhanced. The longer the period of time for the wet nonwoven fabric to contact with the heated roll, the higher the effect of the thermal treatment. Therefore, it is preferred that both surfaces of the wet nonwoven fabric are continuously subjected to thermal treatment for at least 5 seconds or longer per one surface.

In the electrochemical device using activated carbon or activated carbon fiber as an electrode active material, when impurities are contained in the separator, the activated carbon or activated carbon fiber may adsorb the impurities, so that the micropores in the activated carbon or activated carbon fiber are clogged or the specific surface area of the activated carbon or activated carbon fiber is reduced, thus considerably lowering the capacity of the electrochemical device, as compared with the theoretical value. A slight amount of additives which are used in wet paper making, such as a surfactant and a defoamer, are often deposited onto wet nonwoven fabric, and when the wet nonwoven fabric is used as a separator for electrochemical device, such deposits may be adsorbed by the activated carbon or activated carbon fiber to lower the capacity of the electrochemical device. The thermal treatment of the wet nonwoven fabric at 150 to 250° C. also has an effect of volatilizing and removing the deposits. The deposits are hardly volatilized by the thermal treatment at a temperature lower than 150° C.

It is preferred that the separator for electrochemical device of the present invention is calendered. The calendering is carried out using a calender such as a supercalender, a machine calender, a heat calender, a soft calender and a heat soft calender, however, the calendering is preferably performed without heating, for the purpose of preventing the excess calendering and avoiding deterioration of the electrolyte holding properties of the separator.

In the present invention, the calendering improves the surface smoothness of the separator for electrochemical device. Therefore, the adhesion of the separator to electrodes is improved, preventing dislocation or a gap to be formed between the electrodes and the separator for electrochemical device when they are wound together, thus improving the winding properties. Further, when the separator has excellent surface smoothness and excellent adhesion to the electrodes, a large gap is unlikely to be formed locally between the electrodes and the separator in the electrochemical device, and the resistance in the system becomes more uniform, and therefore, not only the capacity and life of the electrochemical device are improved, but also the quality dispersion between the individual electrochemical devices is reduced.

The separator for electrochemical device of the present invention preferably has a moisture absorption of less than 5% as measured after the separator is dried at 150 to 210° C. for one hour or longer, and allowed to stand in an atmosphere at 20° C. at 65% RH for 24 hours or longer. When the moisture absorption exceeds 5%, the drying efficiency is likely to be lowered at a drying process of the separator together with electrodes. The drying of the separator at 150 to 210° C. for one hour or longer means that the separator is dried at a constant temperature selected from the range of from 150 to 210° C. for one hour or longer. In this case, the separator may be dried in vacuum. The drying temperature for the separator is adjusted so that the heat shrinkage degree of the separator for electrochemical device becomes 10% or less, preferably 5% or less. Generally, the drying temperature for the separator is a temperature 5° C. or more lower than the melting temperature or heat decomposition temperature of the main organic fibers constituting the separator for electrochemical device.

It is preferred that the separator for electrochemical device of the present invention has a heat shrinkage degree of less than 5% as measured after the separator is allowed to stand in an atmosphere at 150 to 210° C. for one hour or longer. This means that the separator for electrochemical device has a heat shrinkage degree of less than 5% at any temperature in the range of from 150 to 210° C. When the heat shrinkage degree of the separator exceeds 5%, the separator may swell later and have an increased thickness, so that electrodes having a predetermined area cannot be contained in a battery casing, lowering the capacity of the electrochemical device. In addition, when the separator is dried at a high temperature together with the electrodes, the separator may shrink by heat, so that the electrodes are brought into contact with each other, causing accidental short-circuit.

It is preferred that the separator for electrochemical device of the present invention has a tensile strength in a longitudinal direction of 1 kg/50 mm or more and a puncture strength of 100 g or more. The longitudinal direction means the direction of the flow of paper making for the wet nonwoven fabric. When the tensile strength of the separator is less than 1 kg/50 mm, the separator cannot endure the tension and may be broken depending on the type of the winding machine used; and when the puncture strength of the separator is less than 100 g, the fin of the electrode base material may penetrate the separator. The puncture strength means a load at which a needle having a diameter of 1 mm and having R on its tip penetrates a sample of the separator for electrochemical device, when the needle is vertically disposed onto the surface of the separator sample for electrochemical device at a rate of 1 mm/s.

It is preferred that the separator for electrochemical device of the present invention has a maximum pore diameter of 0.9 to 6 μm. The maximum pore diameter means a maximum pore diameter as measured in accordance with the bubble point method defined in ASTM-F-80. Basically, when the separator for electrochemical device has a maximum pore diameter smaller than the particle diameter of the electrode active material, the electrode active material removed does not penetrate the separator, preventing internal short-circuit. However, the electrode active material actually contains one having a particle diameter smaller than the average particle diameter thereof. Therefore, it is preferred that the maximum pore diameter of the separator for electrochemical device is smaller than the average particle diameter of the electrode active material. Currently, electrode active materials mainly used have an average particle diameter of 3 μm, 6 μm, or 8 μm. Therefore, depending on the average particle diameter of the electrode active material to be used, the separator for electrochemical device having a maximum pore diameter of 0.9 to 6 μm in the present invention can be used.

It is preferred that the separator for electrochemical device of the present invention has a Gurley air permeability of 0.5 s/100 ml to 20 s/100 ml. The Gurley air permeability means a Gurley air permeability defined in JIS P8117, and a period of time until 100 ml of air fed from a circular hole having an outer diameter of 28.6 mm permeates the separator which contacts with the circular hole is used as an index. When the separator has a Gurley air permeability of less than 0.5 s/100 ml, the pore diameters in the separator for electrochemical device may be too large or pinholes may be present in the separator, so that a problem may arise relating internal short-circuit prevention properties, and when the separator has a Gurley air permeability of more than 20 s/100 ml, the density of the separator for electrochemical device may become higher and the ion permeability is lowered, thereby increasing the internal resistance.

It is preferred that the separator for electrochemical device of the present invention exhibits a conductivity of the extract solution of 30 μS/cm or less. The conductivity of the extract solution (extract solution conductivity) means a conductivity of an extract solution which is obtained by immersing the separator for electrochemical device in ion-exchanged water, heating it at 80° C. or higher for a predetermined period of time to extract the ion species contained in the separator, and by cooling the resultant extract solution to 25° C. When the separator exhibits an extract solution conductivity of more than 30 μS/cm, alkali metal ions, alkaline earth metal ions, chloride ions, or sulfuric ions contained in the separator for electrochemical device may be reacted with the electrodes in the electrochemical device over a long term to generate a gas, or a leakage current is increased to deteriorate the electrodes, thus shortening the life of the electrochemical device. On the other hand, when the separator exhibits an extract solution conductivity of 30 μS/cm or less, the amount of these ionic impurities is small and hence the life of the electrochemical device is not adversely affected.

It is preferred that the separator for electrochemical device of the present invention has a center plane average surface roughness SRa of 20 μm or less. The separator for electrochemical device having a smaller thickness preferably has a smaller Sra. Therefore, the SRa is preferably 12 μm or less, further preferably 8 μm or less. The center plane average surface roughness SRa means a center plane average surface roughness SRa as measured using a stylus-type three-dimensional surface roughness tester in the whole wavelength range. When the separator has a center plane average surface roughness SRa of more than 20 μm, voids are likely to be formed between the separator and the electrodes, increasing the internal resistance of the separator for electrochemical device. On the other hand, when the separator has an SRa of 20 μm or less, preferably 12 μm or less, further preferably 8 μm or less, adhesion between the separator and the electrodes is excellent, lowering the internal resistance of the electrochemical device.

The present invention provides a method for producing a separator for electrochemical device comprising a wet nonwoven fabric comprising at least one kind of organic fibers which are at least partially fibrillated into a fiber diameter of 1 μm or less, and at least one kind of unfibrillated organic fibers having fineness of 0.5 dtex or less, which comprises preparing a stock slurry having a solid content of 0.001 to 0.5% and a conductivity of 30 μS/cm or less, and subjecting the stock slurry prepared to wet paper making to produce a separator for electrochemical device.

In the present invention, the stock slurry means a dilute slurry having a solid content of 0.001 to 0.5% immediately before paper making. In the present invention, for obtaining a stock slurry having a conductivity of 30 μS/cm or less, the slurry preparation is made at least using ion-exchanged water having a conductivity of 30 μS/cm or less. Practically, various treatment agents are deposited onto the fibers or a dispersing auxiliary or a defoamer is often added to the fibers during disintegration or dispersion of the fibers. Therefore, the conductivity of the slurry containing the fibers is likely to be higher than the conductivity of ion-exchanged water, and hence it is necessary to use ion-exchanged water having a lower electrical conductivity. It is preferred that the dispersing auxiliary and defoamer used in the disintegration or dispersion of the fibers are nonionic, but an ionic dispersing auxiliary and an ionic defoamer can be used as long as the resultant stock slurry has a conductivity of 30 μS/cm or less.

When the wet nonwoven fabric in the present invention has a monolayer structure, monolayer paper making may be conducted using a fourdrinier paper machine, a cylinder paper machine, or an inclined wire paper machine, and, when the wet nonwoven fabric has a multilayer structure, wet paper making may be conducted using a combination machine comprising two or more of the same or different paper machines selected from the above paper machines, and the fabric is combined to form multilayer fabric. In the present invention, as a paper making wire in the paper machine, a wire as fine as 80 mesh or more is used.

With respect to the basis weight of the wet nonwoven fabric in the present invention, there is no particular limitation, but it is preferably 5 to 50 g/m$^2$, further preferably 10 to 30 g/m$^2$.

With respect to the thickness of the wet nonwoven fabric in the present invention, there is no particular limitation, but, it is preferred that the thickness is smaller since the electrochemical device can be scaled-down, and the electrode area which can be contained in the device is increased and the capacity of the electrochemical device can be increased. Specifically, in view of achieving a strength to an extent such that the separator does not break upon electrochemical device assembling and obtaining a separator free of pinhole having excellent uniformity of thickness, the thickness of the wet nonwoven fabric used is preferably 10 to 200 μm, more preferably 20 to 100 μm, further preferably 20 to 70 μm. When the thickness of the wet nonwoven fabric is less than 10 μm, the short-circuit failure rate in the production of the electrochemical device is disadvantageously increased. On the other hand, when the thickness is more than 200 μm, the electrode area which can be contained in the electrochemical device is reduced, thus lowering the capacity of the electrochemical device.

EXAMPLES

Hereinbelow, the present invention will be described in more detail with reference to the following Examples, which should not be construed as limiting the scope of the present invention.

<Preparation of Fibrillated Organic Fibers 1>

Paraaramid fibers (fineness: 2.5 dtex; fiber length: 3 mm) were dispersed in water so that the initial concentration became 5%, and the resultant dispersion was repeatedly subjected to 8 cycles of refining treatment using a double-disk refiner while reducing the clearance every cycle, and then, repeatedly subjected to 20 cycles of treatment using a high pressure homogenizer under conditions of 500 kg/cm$^2$ to prepare paraaramid fibers having an average fiber length of 0.4 mm, which were at least partially fibrillated into a fiber diameter of 1 μm or less. The fibrillation of the fibers was confirmed by examination under an electron microscope. Hereinafter, the fibers prepared are referred to as "fibrillated organic fibers 1".

<Preparation of Fibrillated Organic Fibers 2>

Paraaramid fibers were fibrillated in substantially the same manner as in <Preparation of fibrillated organic fibers 1> except that the frequency of the treatment using the high pressure homogenizer was changed to 8 cycles to prepare paraaramid fibers having an average fiber length of 1.0 mm, which were at least partially fibrillated into a fiber diameter of 1 μm or less. The fibrillation of the fibers was confirmed by examination under an electron microscope. Hereinafter, the fibers prepared are referred to as "fibrillated organic fibers 2".

<Preparation of Fibrillated Organic Fibers 3>

Paraaramid fibers (fineness: 2.5 dtex; fiber length: 3 mm) were dispersed in water so that the initial concentration became 5%, and the resultant dispersion was repeatedly subjected to 8 cycles of treatment using a high pressure homogenizer to prepare paraaramid fibers having an average fiber length of 1.7 mm, which were at least partially fibrillated into a fiber diameter of 1 μm or less. The fibrillation of the fibers was confirmed by examination under an electron microscope. Hereinafter, the fibers prepared are referred to as "fibrillated organic fibers 3".

<Preparation of Fibrillated Organic Fibers 4>

Paraaramid fibers (fineness: 2.5 dtex; fiber length: 3 mm) were dispersed in water so that the initial concentration became 5%, and the resultant dispersion was repeatedly subjected to 5 cycles of treatment using a high pressure homogenizer to prepare paraaramid fibers having an average fiber length of 2.3 mm, which were at least partially fibrillated into a fiber diameter of 1 μm or less. The fibrillation of the fibers was confirmed by examination under an electron microscope. Hereinafter, the fibers prepared are referred to as "fibrillated organic fibers 4".

<Preparation of Fibrillated Organic Fibers 5>

Paraaramid fibers were fibrillated in substantially the same manner as in <Preparation of fibrillated organic fibers 1> except that the frequency of the treatment using the high pressure homogenizer was changed to 40 cycles to prepare paraaramid fibers having an average fiber length of 0.23 mm, which were at least partially fibrillated into a fiber diameter of 1 μm or less. The fibrillation of the fibers was confirmed by examination under an electron microscope. Hereinafter, the fibers prepared are referred to as "fibrillated organic fibers 5".

<Preparation of Fibrillated Organic Fibers 6>

Totally aromatic polyester (polyarylate) fibers (fineness: 1.9 dtex; fiber length: 3 mm) were dispersed in water so that the initial concentration became 5%, and the resultant dispersion was repeatedly subjected to 6 cycles of refining treatment using a double-disk refiner while reducing the clearance every cycle, and then, repeatedly subjected to 15 cycles of treatment using a high pressure homogenizer under conditions of 500 kg/cm$^2$ to prepare totally aromatic polyester (polyarylate) fibers having an average fiber length of 0.6 mm, which were at least partially fibrillated into a fiber diameter of 1 μm or less. The fibrillation of the fibers was confirmed by examination under an electron microscope. Hereinafter, the fibers prepared are referred to as "fibrillated organic fibers 6".

<Preparation of Fibrillated Organic Fibers 7>

Totally aromatic polyester (polyarylate) fibers were fibrillated in substantially the same manner as in <Preparation of fibrillated organic fibers 6> except that the frequency of the treatment using the high pressure homogenizer was changed to 5 cycles to prepare totally aromatic polyester (polyarylate) fibers having an average fiber length of 1.3 mm, which were at least partially fibrillated into a fiber diameter of 1 μm or less. The fibrillation of the fibers was confirmed by examination under an electron microscope. Hereinafter, the fibers prepared are referred to as "fibrillated organic fibers 7".

<Preparation of Fibrillated Organic Fibers 8>

Totally aromatic polyester (polyarylate) fibers (fineness: 1.9 dtex; fiber length: 3 mm) were dispersed in water so that the initial concentration became 5%, and the resultant dispersion was repeatedly subjected to 8 cycles of treatment using a high pressure homogenizer to prepare totally aromatic polyester (polyarylate) fibers having an average fiber length of 1.8 mm, which were at least partially fibrillated into a fiber diameter of 1 μm or less. The fibrillation of the fibers was confirmed by examination under an electron microscope. Hereinafter, the fibers prepared are referred to as "fibrillated organic fibers 8".

<Preparation of Fibrillated Cellulose Fibers 1>

Linter pulp was dispersed in water so that the initial concentration became 5%, and the resultant dispersion was repeatedly subjected to 5 cycles of refining treatment using a double-disk refiner while reducing the clearance every cycle, and then, repeatedly subjected to 20 cycles of treatment using a high pressure homogenizer under conditions of 500 kg/cm$^2$ to prepare cellulose fibers having an average fiber length of 0.5 mm, which were at least partially fibrillated into a fiber diameter of 1 μm or less. The fibrillation of the fibers was confirmed by examination under an electron microscope. Hereinafter, the fibers prepared are referred to as "fibrillated cellulose fibers 1".

<Preparation of Fibrillated Cellulose Fibers 2>

Solvent-spun cellulose fibers were dispersed in water so that the initial concentration became 5%, and the resultant dispersion was repeatedly subjected to 5 cycles of refining treatment using a double-disk refiner while reducing the clearance every cycle, and then, repeatedly subjected to 20 cycles of treatment using a high pressure homogenizer under conditions of 500 kg/cm$^2$ to prepare cellulose fibers having an average fiber length of 0.6 mm, which were at least partially fibrillated into a fiber diameter of 1 μm or less. The fibrillation of the fibers was confirmed by examination under an electron microscope. Hereinafter, the fibers prepared are referred to as "fibrillated cellulose fibers 2".

<Preparation of Separator for Electrochemical Device>

Example 1

A mixture having a composition of 30% of fibrillated organic fibers 1, 20% of polyester fibers having fineness of 0.1 dtex and a fiber length of 3 mm, 20% of polyester fibers having fineness of 0.4 dtex and a fiber length of 3 mm, and 30% of core-shell conjugate fibers (fineness: 1.1 dtex; fiber length: 3 mm) comprising a core portion comprising polyester having a melting point of 255° C. and a shell portion comprising modified polyester having a melting point of 110° C. was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 1 having a solid content of 0.01% and a conductivity of 2.9 μS/cm. Then, stock slurry 1 was subjected to wet paper making using a cylinder paper machine to prepare wet nonwoven fabric having a basis weight of 18 g/m$^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 18.5 g/m$^2$, a thickness of 55 μm, and a void rate of 76.3%.

Example 2

The wet nonwoven fabric prepared in Example 1 was supercalendered so that the thickness was adjusted to be 40 μm to give a separator for electrochemical device or a separator for electrical double layer capacitor, having a void rate of 67.4%.

Comparative Example 5

The wet nonwoven fabric prepared in Example 1 was passed through two stainless steel rolls heated to 200° C. and pressed at a linear pressure of 300 kg/cm so that the thickness was adjusted to be 35 μm to give a separator for electrochemical device or a separator for electrical double layer capacitor, having a void rate of 62.8%.

Example 4

The wet nonwoven fabric prepared in Example 1 having a basis weight of 18 $g/m^2$, a thickness of 51 μm, and a void rate of 75.1% was used as a separator for electrochemical device or a separator for electrical double layer capacitor as it was without being subjected to thermal treatment.

Example 5

A mixture having a composition of 30% of fibrillated organic fibers 1, 20% of polyester fibers having fineness of 0.1 dtex and a fiber length of 3 mm, 20% of polyester fibers having fineness of 0.4 dtex and a fiber length of 3 mm, and 30% of core-shell conjugate-fibers (fineness: 1.1 dtex; fiber length: 3 mm) comprising a core portion comprising polyester having a melting point of 255° C. and a shell portion comprising modified polyester having a melting point of 110° C. was dispersed in ion-exchanged water, together with an anionic dispersing auxiliary and an amphoteric defoamer, using a pulper so that the solid content became 0.1%. The resultant dispersion was diluted with ion-exchanged water to prepare stock slurry 2 having a solid content of 0.01% and a conductivity of 31.2 μS/cm. Then, stock slurry 2 was subjected to wet paper making using a cylinder paper machine to prepare wet nonwoven fabric having a basis weight of 18 $g/m^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 18.5 $g/m^2$, a thickness of 55 μm, and a void rate of 76.3%.

Example 6

A mixture having a composition of 30% of fibrillated organic fibers 1, 20% of polyester fibers having fineness of 0.1 dtex and a fiber length of 3 mm, 15% of polyester fibers having fineness of 0.4 dtex and a fiber length of 3 mm, 30% of the core-shell conjugate fibers used in Example 1, and 5% of fibrillated cellulose fibers 1 was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 3 having a solid content of 0.01% and a conductivity of 3.3 μS/cm. Then, stock slurry 3 was subjected to wet paper making using a cylinder paper machine to prepare wet nonwoven fabric having a basis weight of 18 $g/m^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 18.5 $g/m^2$, a thickness of 54 μm, and a void rate of 75.8%.

Example 7

The wet nonwoven fabric prepared in Example 6 was supercalendered so that the thickness was adjusted to be 40 μm to give a separator for electrochemical device or a separator for electrical double layer capacitor, having a void rate of 67.4%.

Example 8

The wet nonwoven fabric prepared in Example 6 having a basis weight of 18 $g/m^2$, a thickness of 50 μm, and a void rate of 74.6% was used as a separator for electrochemical device or a separator for electrical double layer capacitor as it was without being subjected to thermal treatment.

Example 9

A mixture having a composition of 20% of fibrillated organic fibers 1, 30% of polyester fibers having fineness of 0.1 dtex and a fiber length of 3 mm, 15% of polyester fibers having fineness of 0.4 dtex and a fiber length of 3 mm, 30% of the core-shell conjugate fibers used in Example 1, and 5% of bacterial cellulose was dispersed in ion-exchanged water, together with a nonionic dispersing auxiliary and a nonionic defoamer, using a pulper so that the solid content became 0.2%. The resultant dispersion was diluted with ion-exchanged water to prepare stock slurry 4 having a solid content of 0.01% and a conductivity of 4.1 μS/cm. Then, stock slurry 4 was subjected to wet paper making using a cylinder paper machine to prepare wet nonwoven fabric having a basis weight of 21 $g/m^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 22 $g/m^2$, a thickness of 65 μm, and a void rate of 76.1%.

Example 10

A mixture having a composition of 40% of fibrillated organic fibers 1, 20% of polyester fibers having fineness of 0.1 dtex and a fiber length of 3 mm, 5% of polyester fibers having fineness of 0.4 dtex and a fiber length of 3 mm, 30% of the core-shell conjugate fibers used in Example 1, and 5% of microglass fiber having an average fiber diameter of 0.3 μm was dispersed in ion-exchanged water, together with a nonionic dispersing auxiliary and a nonionic defoamer, using a pulper so that the solid content became 0.2%. The resultant dispersion was diluted with ion-exchanged water to prepare stock slurry 5 having a solid content of 0.01% and a conductivity of 5.2 μS/cm. Then, stock slurry 5 was subjected to wet paper making using a cylinder paper machine to prepare wet nonwoven fabric having a basis weight of 15.5 $g/m^2$. The wet nonwoven fabric was subjected to thermal treatment so that both surfaces of the fabric were brought into contact with a drum roll heated to 210° C. having a diameter of 1.2 m at a rate of 20 m/min to give a separator for electrochemical device or a separator for electrical double layer capacitor, having a basis weight of 16 $g/m^2$, a thickness of 50 μm, and a void rate of 78%.

Example 11

The wet nonwoven fabric prepared in Example 10 was supercalendered so that the thickness was adjusted to be 35 μm to give a separator for electrochemical device or a separator for electrical double layer capacitor, having a void rate of 68.9%.

Example 12

The wet nonwoven fabric prepared in Example 10 having a basis weight of 15.5 $g/m^2$, a thickness of 45 μm, and a void rate of 76.5% was used as a separator for electrochemical device or a separator for electrical double layer capacitor as it was without being subjected to thermal treatment.

Example 13

A mixture having a composition of 10% of fibrillated organic fibers 1, 30% of polyester fibers having fineness of 0.1 dtex and a fiber length of 3 mm, 20% of polyester fibers having fineness of 0.4 dtex and a fiber length of 3 mm, 30% of the core-shell conjugate fibers used in Example 1, and 10% of microglass fiber having an average fiber diameter of 0.3 $\mu$m was dispersed in ion-exchanged water, together with a nonionic dispersing auxiliary and a nonionic defoamer, using a pulper so that the solid content became 0.2%. The resultant dispersion was diluted with ion-exchanged water to prepare stock slurry 6 having a solid content of 0.01% and a conductivity of 8.5 $\mu$S/cm. Then, stock slurry 6 was subjected to wet paper making using a cylinder paper machine to prepare wet nonwoven fabric having a basis weight of 23.5 g/m$^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 24 g/m$^2$, a thickness of 83 $\mu$m, and a void rate of 80.8%.

Example 14

A mixture having a composition of 20% of fibrillated organic fibers 1, 20% of polyester fibers having fineness of 0.1 dtex and a fiber length of 3 mm, 10% of polyester fibers having fineness of 0.4 dtex and a fiber length of 3 mm, 25% of the core-shell conjugate fibers used in Example 1, 5% of fibrillated cellulose fibers 1, and 20% of microglass fiber having an average fiber diameter of 0.65 $\mu$m was dispersed in ion-exchanged water, together with a nonionic dispersing auxiliary and a nonionic defoamer, using a pulper so that the solid content became 0.2%. The resultant dispersion was diluted with ion-exchanged water to prepare stock slurry 7 having a solid content of 0.01% and a conductivity of 6.0 $\mu$S/cm. Then, stock slurry 7 was subjected to wet paper making using a cylinder paper machine to prepare wet nonwoven fabric having a basis weight of 21 g/m$^2$. The wet nonwoven fabric was subjected to thermal treatment so that both surfaces of the fabric were brought into contact with a drum roll heated to 220° C. having a diameter of 1.2 m at a rate of 20 m/min to give a separator for electrochemical device or a separator for electrical double layer capacitor, having a basis weight of 21.5 g/m$^2$, a thickness of 76 $\mu$m, and a void rate of 82.1%.

Example 15

A mixture having a composition of 25% of fibrillated organic fibers 1, 25% of polyester fibers having fineness of 0.1 dtex and a fiber length of 3 mm, 7% of polyester fibers having fineness of 0.4 dtex and a fiber length of 3 mm, 30% of the core-shell conjugate fibers used in Example 1, 8% of fibrillated cellulose fibers 1, and 5% of microglass fiber having an average fiber diameter of 0.3 $\mu$m was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 8 having a solid content of 0.01% and a conductivity of 3.3 $\mu$S/cm. Then, stock slurry 8 was subjected to wet paper making using a cylinder paper machine to prepare wet nonwoven fabric having a basis weight of 18 g/m$^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 18.5 g/m$^2$, a thickness of 56 $\mu$m, and a void rate of 77.2%.

Example 16

The wet nonwoven fabric prepared in Example 15 was supercalendered so that the thickness was adjusted to be 40 $\mu$m to give a separator for electrochemical device or a separator for electrical double layer capacitor, having a void rate of 68%.

Example 17

A mixture having a composition of 30% of fibrillated organic fibers 1, 30% of fibrillated organic fibers 2, 10% of polyester fibers having fineness of 0.1 dtex and a fiber length of 3 mm, 5% of polyester fibers having fineness of 0.4 dtex and a fiber length of 3 mm, and 25% of the core-shell conjugate fibers used in Example 1 was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 9 having a solid content of 0.01% and a conductivity of 3.1 $\mu$S/cm. Then, stock slurry 9 was subjected to wet paper making using a cylinder paper machine to prepare wet nonwoven fabric having a basis weight of 18 g/m$^2$. The wet nonwoven fabric was subjected to thermal treatment so that both surfaces of the fabric were brought into contact with a drum roll heated to 185° C. having a diameter of 1.2 m at a rate of 20 m/min to give a separator for electrochemical device or a separator for electrical double layer capacitor, having a basis weight of 18.5 g/m$^2$ a thickness of 50 $\mu$m, and a void rate of 77%.

Example 18

The wet nonwoven fabric prepared in Example 17 was supercalendered so that the thickness was adjusted to be 40 $\mu$m to give a separator for electrochemical device or a separator for electrical double layer capacitor, having a void rate of 67.4%.

Example 19

A mixture having a composition of 25% of fibrillated organic fibers 1, 30% of fibrillated organic fibers 2, 17% of polyester fibers having fineness of 0.1 dtex and a fiber length of 3 mm, 25% of the core-shell conjugate fibers used in Example 1, and 3% of fibrillated cellulose fibers 1 was dispersed in ion-exchanged water, together with an anionic dispersing auxiliary and a nonionic defoamer, using a pulper so that the solid content became 0.1%. The resultant dispersion was diluted with ion-exchanged water to prepare stock slurry 10 having a solid content of 0.01% and a conductivity of 27.5 $\mu$S/cm. Then, stock slurry 10 was subjected to wet paper making using a cylinder paper machine to prepare wet nonwoven fabric having a basis weight of 18 g/m$^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 18.5 g/m$^2$, a thickness of 55 $\mu$m, and a void rate of 76.3%.

Example 20

The wet nonwoven fabric prepared in Example 19 was supercalendered so that the thickness was adjusted to be 40

μm to give a separator for electrochemical device or a separator for electrical double layer capacitor, having a void rate of 67.3%.

Example 21

A mixture having a composition of 30% of fibrillated organic fibers 1, 35% of fibrillated organic fibers 3, 5% of polyester fibers having fineness of 0.1 dtex and a fiber length of 3 mm, 22% of the core-shell conjugate fibers used in Example 1, and 8% of bacterial cellulose was dispersed in ion-exchanged water, together with an anionic dispersing auxiliary and a nonionic defoamer, using a pulper so that the solid content became 0.1%. The resultant dispersion was diluted with ion-exchanged water to prepare stock slurry 11 having a solid content of 0.01% and a conductivity of 18.7 μS/cm. Then, stock slurry 11 was subjected to wet paper making using a cylinder paper machine to prepare wet nonwoven fabric having a basis weight of 16.5 g/m$^2$. The wet nonwoven fabric was subjected to thermal treatment so that both surfaces of the fabric were brought into contact with a drum roll heated to 190° C. having a diameter of 1.2 m at a rate of 20 m/min to give a separator for electrochemical device or a separator for electrical double layer capacitor, having a basis weight of 17 g/m$^2$, a thickness of 51 μm, and a void rate of 76.5%.

Example 22

A mixture having a composition of 30% of fibrillated organic fibers 1, 30% of fibrillated organic fibers 3, 10% of polyester fibers having fineness of 0.1 dtex and a fiber length of 3 mm, 25% of the core-shell conjugate fibers used in Example 1, and 5% of microglass fiber having an average fiber diameter of 3 μm was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 12 having a solid content of 0.01% and a conductivity of 3.5 μS/cm. Then, stock slurry 12 was subjected to wet paper making using a cylinder paper machine to prepare wet nonwoven fabric having a basis weight of 16.5 g/m$^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 17 g/m$^2$, a thickness of 55 μm, and a void rate of 79.5%.

Example 23

A mixture having a composition of 30% of fibrillated organic fibers 1, 30% of fibrillated organic fibers 3, 5% of polyester fibers having fineness of 0.1 dtex and a fiber length of 3 mm, 25% of the core-shell conjugate fibers used in Example 1, 5% of fibrillated cellulose fibers 1, and 5% of microglass fiber having an average fiber diameter of 0.3 μm was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 13 having a solid content of 0.01% and a conductivity of 6.6 μS/cm. Then, stock slurry 13 was subjected to wet paper making using a cylinder paper machine to prepare wet nonwoven fabric having a basis weight of 15.5 g/m$^2$. The wet nonwoven fabric was subjected to thermal treatment so that both surfaces of the fabric were brought into contact with a drum roll heated to 210° C. having a diameter of 1.2 m at a rate of 20 m/min to give a separator for electrochemical device or a separator for electrical double layer capacitor, having a basis weight of 16 g/m$^2$, a thickness of 49 μm, and a void rate of 77.6%.

Example 24

The wet nonwoven fabric prepared in Example 23 was supercalendered so that the thickness was adjusted to be 35 μm to give a separator for electrochemical device or a separator for electrical double layer capacitor, having a void rate of 68.7%.

Example 25

A mixture having a composition of 40% of fibrillated organic fibers 2, 25% of polyester fibers having fineness of 0.1 dtex and a fiber length of 3 mm, 30% of the core-shell conjugate fibers used in Example 1, and 5% of fibrillated cellulose fibers 1 was dispersed in ion-exchanged water, together with a nonionic dispersing auxiliary and a nonionic defoamer, using a pulper so that the solid content became 0.1% The resultant dispersion was diluted with ion-exchanged water to prepare stock slurry 14 having a solid content of 0.01% and a conductivity of 14.0 μS/cm. Then, stock slurry 14 was subjected to wet paper making using a cylinder paper machine to prepare wet nonwoven fabric having a basis weight of 15.5 g/m$^2$. The wet nonwoven fabric was subjected to thermal treatment so that both surfaces of the fabric were brought into contact with a drum roll heated to 180° C. having a diameter of 1.2 m at a rate of 20 m/min to give a separator for electrochemical device or a separator for electrical double layer capacitor, having a basis weight of 16 g/m$^2$, a thickness of 48 μm, and a void rate of 76.5%.

Example 26

The wet nonwoven fabric prepared in Example 25 was supercalendered so that the thickness was adjusted to be 35 μm to give a separator for electrochemical device or a separator for electrical double layer capacitor, having a void rate of 67.8%.

Example 27

A mixture having a composition of 50% of fibrillated organic fibers 3, 30% of polyester fibers having fineness of 0.1 dtex and a fiber length of 3 mm, and 20% of the core-shell conjugate fibers used in Example 1 was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 15 having a solid content of 0.01% and a conductivity of 4.6 μS/cm. Then, stock slurry 15 was subjected to wet paper making using a cylinder paper machine to prepare wet nonwoven fabric having a basis weight of 19.5 g/m$^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 20 g/m$^2$, a thickness of 60 μm, and a void rate of 76.5%.

Example 28

The wet nonwoven fabric prepared in Example 27 was supercalendered so that the thickness was adjusted to be 42

μm to give a separator for electrochemical device or a separator for electrical double layer capacitor, having a void rate of 66.4%.

Example 29

A mixture having a composition of 20% of fibrillated organic fibers 3, 30% of polyester fibers having fineness of 0.1 dtex and a fiber length of 3 mm, 20% of polyester fibers having fineness of 0.4 dtex and a fiber length of 3 mm, and 30% of the core-shell conjugate fibers used in Example 1 was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 16 having a solid content of 0.01% and a conductivity of 7.7 μS/cm. Then, stock slurry 16 was subjected to wet paper making using a cylinder paper machine to prepare wet nonwoven fabric having a basis weight of 16.5 $g/m^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 17 $g/m^2$, a thickness of 48 μm, and a void rate of 76.5%.

Example 30

The wet nonwoven fabric prepared in Example 29 was supercalendered so that the thickness was adjusted to be 35 μm to give a separator for electrochemical device or a separator for electrical double layer capacitor, having a void rate of 67.8%.

Example 31

A mixture having a composition of 25% of fibrillated organic fibers 1, 30% of fibrillated organic fibers 2, 20% of polyester fibers having fineness of 0.1 dtex and a fiber length of 3 mm, 20% of polyester fibers having fineness of 0.4 dtex and a fiber length of 3 mm, and 5% of fibrillated cellulose fibers 1 was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 17 having a solid content of 0.01% and a conductivity of 3.2 μS/cm. Then, stock slurry 17 was subjected to wet paper making using a cylinder paper machine to prepare wet nonwoven fabric having a basis weight of 17.5 $g/m^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 18 $g/m^2$, a thickness of 55 μm, and a void rate of 77%.

Example 32

The wet nonwoven fabric prepared in Example 31 was supercalendered so that the thickness was adjusted to be 40 μm to give a separator for electrochemical device or a separator for electrical double layer capacitor, having a void rate of 68.3%.

Example 35

A mixture having a composition of 25% of fibrillated organic fibers 1, 30% of fibrillated organic fibers 2, 20% of polyester fibers having fineness of 0.1 dtex and a fiber length of 3 mm, 20% of polyester fibers having fineness of 0.4 dtex and a fiber length of 3 mm, and 5% of bacterial cellulose was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 19 having a solid content of 0.01% and a conductivity of 5.9 μS/cm. Then, stock slurry 19 was subjected to wet paper making using a cylinder paper machine to prepare wet nonwoven fabric having a basis weight of 17.5 $g/m^2$. The wet nonwoven fabric was subjected to thermal treatment so that both surfaces of the fabric were brought into contact with a drum roll heated to 170° C. having a diameter of 1.2 m at a rate of 20 m/min to give a separator for electrochemical device or a separator for electrical double layer capacitor, having a basis weight of 18 $g/m^2$, a thickness of 55 μm, and a void rate of 77%.

Example 36

A mixture having a composition of 30% of fibrillated organic fibers 1, 25% of acrylic fibers having fineness of 0.1 dtex and a fiber length of 3 mm, 20% of acrylic fibers having fineness of 0.4 dtex and a fiber length of 3 mm, and 25% of core-shell conjugate fibers (fineness: 2.8 dtex; fiber length: 5 mm) comprising a core portion comprising polyester having a melting point of 255° C. and a shell portion comprising modified polyester having a melting point of 110° C. was dispersed in ion-exchanged water, together with a nonionic dispersing auxiliary and an amphoteric defoamer, using a pulper so that the solid content became 0.5%. The resultant dispersion was diluted with ion-exchanged water to prepare stock slurry 20 having a solid content of 0.1% and a conductivity of 23.8 μS/cm. Then, stock slurry 20 was subjected to wet paper making using a cylinder paper machine to prepare wet nonwoven fabric having a basis weight of 17.5 $g/m^2$. The wet nonwoven fabric was subjected to thermal treatment so that both surfaces of the fabric were brought into contact with a drum roll heated to 150° C. having a diameter of 1.2 m at a rate of 10 m/min to give a separator for electrochemical device or a separator for electrical double layer capacitor, having a basis weight of 18 $g/m^2$, a thickness of 54 μm, and a void rate of 75.3%.

Example 37

The wet nonwoven fabric prepared in Example 36 was supercalendered so that the thickness was adjusted to be 40 μm to give a separator for electrochemical device or a separator for electrical double layer capacitor, having a void rate of 65.9%.

Example 40

Using stock slurry 1 prepared in Example 1, paper making was carried out successively by means of a cylinder paper machine and a fourdrinier paper machine at the same paper making rate while adjusting the flow rate so that the basis weight in the cylinder paper machine became 9 $g/m^2$ and that in the fourdrinier paper machine became 9 $g/m^2$ to prepare wet nonwoven fabric having a two-layer structure and a basis weight of 18 $g/m^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 18.5 $g/m^2$, a thickness of 55 μm, and a void rate of 76.3%.

Example 41

The wet nonwoven fabric prepared in Example 40 was supercalendered so that the thickness was adjusted to be 40 μm to give a separator for electrochemical device or a separator for electrical double layer capacitor, having a void rate of 67.4%.

Example 42

Using stock slurry 3 prepared in Example 6, paper making was carried out successively by means of a cylinder paper machine and a fourdrinier paper machine at the same paper making rate while adjusting the flow rate so that the basis weight in the cylinder paper machine became 9 $g/m^2$ and that in the fourdrinier paper machine became 9 $g/m^2$ to prepare wet nonwoven fabric having a two-layer structure and a basis weight of 18 $g/m^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 18.5 $g/m^2$, a thickness of 55 μm, and a void rate of 76.3%.

Example 43

The wet nonwoven fabric prepared in Example 42 was supercalendered so that the thickness was adjusted to be 40 μm to give a separator for electrochemical device or a separator for electrical double layer capacitor, having a void rate of 67.4%.

Example 44

Using stock slurry 13 prepared in Example 23, paper making was carried out successively by means of a cylinder paper machine and an inclined wire paper machine at the same paper making rate while adjusting the flow rate so that the basis weight in the cylinder paper machine became 8 $g/m^2$ and that in the inclined wire paper machine became 8 $g/m^2$ to prepare wet nonwoven fabric having a two-layer structure and a basis weight of 16 $g/m^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 16.5 $g/m^2$, a thickness of 50 μm, and a void rate of 77.4%.

Example 45

Using stock slurry 3 prepared in Example 6 and a twin cylinder paper machine, paper making was carried out while adjusting the flow rate so that the basis weight in one cylinder became 14 $g/m^2$ and that in another became 5 $g/m^2$ to prepare wet nonwoven fabric having a two-layer structure comprising relatively higher and lower density layers, and having a basis weight of 19 $g/m^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 19.5 $g/m^2$, a thickness of 59 μm, and a void rate of 76.7%.

Example 46

The wet nonwoven fabric prepared in Example 45 was supercalendered so that the thickness was adjusted to be 42 μm to give a separator for electrochemical device or a separator for electrical double layer capacitor, having a void rate of 67.4%.

Example 47

Using stock slurry 13 prepared in Example 23, stock slurry 1 prepared in Example 1, and a twin cylinder paper machine, paper making was carried out while adjusting the flow rate so that the basis weight in one cylinder from slurry 13 became 14 $g/m^2$ and that in another from slurry 1 became 5 $g/m^2$ to prepare wet nonwoven fabric having a two-layer structure comprising relatively higher and lower density layers, and having a basis weight of 19 $g/m^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 19.5 $g/m^2$, a thickness of 58 μm, and a void rate of 76.8%.

Example 48

The wet nonwoven fabric prepared in Example 47 was supercalendered so that the thickness was adjusted to be 42 μm to give a separator for electrochemical device or a separator for electrical double layer capacitor, having a void rate of 68.1%.

Example 49

Using stock slurry 9 prepared in Example 17 and a triple cylinder paper machine, paper making was carried out while adjusting the flow rate so that the basis weights in the first and third cylinders individually became 5 $g/m^2$ and that in the second one became 10 $g/m^2$ to prepare wet nonwoven fabric having a three-layer structure comprising relatively higher and lower density layers such that the outer layer has a lower density and the inner layer has a higher density, and having a basis weight of 20 $g/m^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 20.5 $g/m^2$, a thickness of 62 μm, and a void rate of 75.9%.

Example 50

The wet nonwoven fabric prepared in Example 49 was supercalendered so that the thickness was adjusted to be 45 μm to give a separator for electrochemical device or a separator for electrical double layer capacitor, having a void rate of 67.9%.

Example 51

A mixture having a composition of 30% of fibrillated organic fibers 6, 25% of polyester fibers having fineness of 0.1 dtex and a fiber length of 3 mm, 15% of polyester fibers having fineness of 0.5 dtex and a fiber length of 3 mm, and 30% of core-shell conjugate fibers (fineness: 1.7 dtex; fiber length: 5 mm) comprising a core portion comprising polyester having a melting point of 255° C. and a shell portion comprising modified polyester having a melting point of 110° C. was dispersed in ion-exchanged water, together with a nonionic dispersing auxiliary and a nonionic defoamer, using a pulper so that the solid content became 0.5%. The resultant dispersion was diluted with ion-exchanged water to prepare stock slurry 22 having a solid content of 0.01% and a conductivity of 7.0 μS/cm. Then, stock slurry 22 was subjected to wet paper making using a cylinder paper machine to prepare wet nonwoven fabric having a basis weight of 22 $g/m^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 23 $g/m^2$, a thickness of 70 μm, and a void rate of 76.9%.

Example 52

The wet nonwoven fabric prepared in Example 51 was supercalendered so that the thickness was adjusted to be 50 μm to give a separator for electrochemical device or a separator for electrical double layer capacitor, having a void rate of 67.6%.

Example 54

A mixture having a composition of 30% of fibrillated organic fibers 6, 20% of polyester fibers having fineness of 0.1 dtex and a fiber length of 3 mm, 12% of polyester fibers having fineness of 0.5 dtex and a fiber length of 3 mm, 30% of the core-shell conjugate fibers used in Example 51, and 8% of fibrillated cellulose fibers 1 was dispersed in ion-exchanged water, together with a nonionic dispersing auxiliary and a nonionic defoamer, using a pulper so that the solid content became 0.5%. The resultant dispersion was diluted with ion-exchanged water to prepare stock slurry 23 having a solid content of 0.01% and a conductivity of 7.2 μS/cm. Then, stock slurry 23 was subjected to wet paper making using a cylinder paper machine to prepare wet nonwoven fabric having a basis weight of 22 $g/m^2$. The wet nonwoven fabric was subjected to thermal treatment so that both surfaces of the fabric were brought into contact with a drum roll heated to 190° C. having a diameter of 1.2 m at a rate of 20 m/min to give a separator for electrochemical device or a separator for electrical double layer capacitor, having a basis weight of 23 $g/m^2$, a thickness of 65 μm, and a void rate of 75.1%.

Example 55

A mixture having a composition of 30% of fibrillated organic fibers 6, 20% of polyester fibers having fineness of 0.1 dtex and a fiber length of 3 mm, 12% of polyester fibers having fineness of 0.5 dtex and a fiber length of 3 mm, 30% of the core-shell conjugate fibers used in Example 51, and 8% of bacterial cellulose was dispersed in ion-exchanged water, together with a nonionic dispersing auxiliary and a nonionic defoamer, using a pulper so that the solid content became 0.5%. The resultant dispersion was diluted with ion-exchanged water to prepare stock slurry 24 having a solid content of 0.01% and a conductivity of 9.5 μS/cm. Then, stock slurry 24 was subjected to wet paper making using a cylinder paper machine to prepare wet nonwoven fabric having a basis weight of 22 $g/m^2$. The wet nonwoven fabric was subjected to thermal treatment so that both surfaces of the fabric were brought into contact with a drum roll heated to 190° C. having a diameter of 1.2 m at a rate of 20 m/min to give a separator for electrochemical device or a separator for electrical double layer capacitor, having a basis weight of 23 $g/m^2$, a thickness of 64 μm, and a void rate of 74.7%.

Example 56

A mixture having a composition of 40% of fibrillated organic fibers 7, 20% of polyester fibers having fineness of 0.1 dtex and a fiber length of 3 mm, 30% of the core-shell conjugate fibers used in Example 51, 5% of fibrillated cellulose fibers 1, and 5% of microglass fiber having an average fiber diameter of 0.3 μm was dispersed in ion-exchanged water, together with a nonionic dispersing auxiliary and a nonionic defoamer, using a pulper so that the solid content became 0.5%. The resultant dispersion was diluted with ion-exchanged water to prepare stock slurry 25 having a solid content of 0.01% and a conductivity of 15.0 μS/cm. Then, stock slurry 25 was subjected to wet paper making using a cylinder paper machine to prepare wet nonwoven fabric having a basis weight of 14.5 $g/m^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 15 $g/m^2$, a thickness of 43 μm, and a void rate of 76.1%.

Example 57

The wet nonwoven fabric prepared in Example 56 was supercalendered so that the thickness was adjusted to be 30 μm to give a separator for electrochemical device or a separator for electrical double layer capacitor, having a void rate of 65.7%.

Example 58

A mixture having a composition of 40% of fibrillated organic fibers 7, 20% of polyester fibers having fineness of 0.1 dtex and a fiber length of 3 mm, 30% of the core-shell conjugate fibers used in Example 51, 5% of fibrillated cellulose fibers 1, and 5% of microglass fiber having an average fiber diameter of 3 μm was dispersed in ion-exchanged water, together with an anionic dispersing auxiliary and an amphoteric defoamer, using a pulper so that the solid content became 0.5%. The resultant dispersion was diluted with ion-exchanged water to prepare stock slurry 26 having a solid content of 0.01% and a conductivity of 32.0 μS/cm. Then, stock slurry 26 was subjected to wet paper making using a cylinder paper machine to prepare wet nonwoven fabric having a basis weight of 14.5 $g/m^2$. The wet nonwoven fabric was subjected to thermal treatment so that both surfaces of the fabric were brought into contact with a drum roll heated to 200° C. having a diameter of 1.2 m at a rate of 20 m/min to give a separator for electrochemical device or a separator for electrical double layer capacitor, having a basis weight of 15 $g/m^2$, a thickness of 43 μm, and a void rate of 76.1%.

Example 59

A mixture having a composition of 50% of fibrillated organic fibers 8, 25% of polyester fibers having fineness of 0.1 dtex and a fiber length of 3 mm, and 25% of the core-shell conjugate fibers used in Example 51 was dispersed in ion-exchanged water, together with a nonionic dispersing auxiliary and a nonionic defoamer, using a pulper so that the solid content became 1.0%. The resultant dispersion was diluted with ion-exchanged water to prepare stock slurry 27 having a solid content of 0.5% and a conductivity of 4.0 μS/cm. Then, stock slurry 27 was subjected to wet paper making using a cylinder paper machine to prepare wet nonwoven fabric having a basis weight of 20.5 $g/m^2$. The wet nonwoven fabric was subjected to thermal treatment so that both surfaces of the fabric were brought into contact with a drum roll heated to 180° C.

having a diameter of 1.2 m at a rate of 10 m/min to give a separator for electrochemical device or a separator for electrical double layer capacitor, having a basis weight of 21 g/m, a thickness of 63 μm, and a void rate of 76.5%.

Example 60

The wet nonwoven fabric prepared in Example 59 was supercalendered so that the thickness was adjusted to be 45 μm to give a separator for electrochemical device or a separator for electrical double layer capacitor, having a void rate of 67.1%.

Example 63

A mixture having a composition of 20% of fibrillated organic fibers 6, 20% of fibrillated organic fibers 8, 30% of acrylic fibers having fineness of 0.1 dtex and a fiber length of 3 mm, and 30% of the core-shell conjugate fibers used in Example 51 was dispersed in ion-exchanged water, together with a nonionic dispersing auxiliary and a nonionic defoamer, using a pulper so that the solid content became 0.2%. The resultant dispersion was diluted with ion-exchanged water to prepare stock slurry 29 having a solid content of 0.01% and a conductivity of 23.0 μS/cm. Then, stock slurry 29 was subjected to wet paper making using a fourdrinier paper machine to prepare wet nonwoven fabric having a basis weight of 20.8 $g/m^2$. The wet nonwoven fabric was subjected to thermal treatment so that both surfaces of the fabric were brought into contact with a drum roll heated to 160° C. having a diameter of 1.2 m at a rate of 5 m/min to give a separator for electrochemical device or a separator for electrical double layer capacitor, having a basis weight of 21 $g/m^2$, a thickness of 63 μm, and a void rate of 75.5%.

Example 64

The wet nonwoven fabric prepared in Example 63 was supercalendered so that the thickness was adjusted to be 45 μm to give a separator for electrochemical device or a separator for electrical double layer capacitor, having a void rate of 66%.

Example 65

A mixture having a composition of 30% of fibrillated organic fibers 6, 30% of fibrillated organic fibers 8, 10% of acrylic fibers having fineness of 0.3 dtex and a fiber length of 3 mm, 25% of the core-shell conjugate fibers used in Example 51, and 5% of fibrillated cellulose fibers 1 was dispersed in ion-exchanged water, together with a nonionic dispersing auxiliary and a nonionic defoamer, using a pulper so that the solid content became 0.2%. The resultant dispersion was diluted with ion-exchanged water to prepare stock slurry 30 having a solid content of 0.005% and a conductivity of 8.8 μS/cm. Then, stock slurry 30 was subjected to wet paper making using a fourdrinier paper machine to prepare wet nonwoven fabric having a basis weight of 16 $g/m^2$. The wet nonwoven fabric was subjected to thermal treatment so that both surfaces of the fabric were brought into contact with a drum roll heated to 180° C. having a diameter of 1.2 m at a rate of 10 m/min to give a separator for electrochemical device or a separator for electrical double layer capacitor, having a basis weight of 16.5 $g/m^2$, a thickness of 48 μm, and a void rate of 77.1%.

Example 66

The wet nonwoven fabric prepared in Example 65 was supercalendered so that the thickness was adjusted to be 35 μm to give a separator for electrochemical device or a separator for electrical double layer capacitor, having a void rate of 68.5%.

Example 69

A mixture having a composition of 30% of fibrillated organic fibers 6, 30% of fibrillated organic fibers 7, 20% of polyester fibers having fineness of 0.1 dtex and a fiber length of 3 mm, 12% of polyester fibers having fineness of 0.5 dtex and a fiber length of 3 mm, and 8% of fibrillated cellulose fibers 1 was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 32 having a solid content of 0.001% and a conductivity of 4.5 μS/cm. Then, stock slurry 32 was subjected to wet paper making using a cylinder paper machine to prepare wet nonwoven fabric having a basis weight of 16 $g/m^2$. The wet nonwoven fabric was subjected to thermal treatment so that both surfaces of the fabric were brought into contact with a drum roll heated to 150° C. having a diameter of 1.2 m at a rate of 10 m/min to give a separator for electrochemical device or a separator for electrical double layer capacitor, having a basis weight of 16.5 $g/m^2$, a thickness of 50 μm, and a void rate of 76.7%.

Example 70

The wet nonwoven fabric prepared in Example 69 was supercalendered so that the thickness was adjusted to be 35 μm to give a separator for electrochemical device or a separator for electrical double layer capacitor, having a void rate of 66.8%.

Example 71

Using stock slurry 22 prepared in Example 51 and a twin cylinder paper machine, paper making was carried out while adjusting the flow rate so that the basis weight in one cylinder became 11 $g/m^2$ and that in another became 11 $g/m^2$ to prepare wet nonwoven fabric having a two-layer structure with a basis weight of 22 $g/m^2$. The wet nonwoven fabric was subjected to thermal treatment so that both surfaces of the fabric were brought into contact with a drum roll heated to 190° C. having a diameter of 1.2 m at a rate of 20 m/min to give a separator for electrochemical device or a separator for electrical double layer capacitor, having a basis weight of 23 $g/m^2$, a thickness of 65 μm, and a void rate of 75.1%.

Example 72

The wet nonwoven fabric prepared in Example 71 was supercalendered so that the thickness was adjusted to be 50 μm to give a separator for electrochemical device or a separator for electrical double layer capacitor, having a void rate of 67.6%.

Example 73

Using stock slurry 25 prepared in Example 56, paper making was carried out successively by means of a cylinder paper machine and an inclined wire paper machine while adjusting the flow rate so that the basis weight in the cylinder paper machine became 14 $g/m^2$ and that in the inclined wire paper machine became 5 $g/m^2$ to prepare wet nonwoven fabric having a two-layer structure comprising relatively higher and lower density layers, and having a basis weight of 19 $g/m^2$. The wet nonwoven fabric was subjected to thermal treatment so that both surfaces of the fabric were brought into contact with a drum roll heated to 190° C. having a diameter of 1.2 m at a rate of 20 m/min to give a separator for electrochemical device or a separator for electrical double layer capacitor, having a basis weight of 19.5 g/m$^2$, a thickness of 58 $\mu$m, and a void rate of 77.1%.

Example 74

The wet nonwoven fabric prepared in Example 73 was supercalendered so that the thickness was adjusted to be 40 $\mu$m to give a separator for electrochemical device or a separator for electrical double layer capacitor, having a void rate of 66.8%.

Example 75

Using stock slurry 25 prepared in Example 56 and a triple cylinder paper machine, paper making was carried out while adjusting the flow rate so that the basis weights in the first and third cylinders individually became 5 g/m$^2$ and that in the second one became 10 g/m$^2$ to prepare wet nonwoven fabric having a three-layer structure comprising relatively higher and lower density layers such that the outer layer has a lower density and the inner layer has a higher density, and having a basis weight of 20 g/m$^2$. The wet nonwoven fabric was subjected to thermal treatment so that both surfaces of the fabric were brought into contact with a drum roll heated to 190° C. having a diameter of 1.2 m at a rate of 20 m/min to give a separator for electrochemical device or a separator for electrical double layer capacitor, having a basis weight of 20.5 g/m$^2$, a thickness of 60 $\mu$m, and a void rate of 76.7%.

Example 76

The wet nonwoven fabric prepared in Example 75 was supercalendered so that the thickness was adjusted to be 45 $\mu$m to give a separator for electrochemical device or a separator for electrical double layer capacitor, having a void rate of 69%.

Comparative Example 3

A mixture having a composition of 30% of fibrillated organic fibers 4, 20% of polyester fibers having fineness of 0.1 dtex and a fiber length of 3 mm, 20% of polyester fibers having fineness of 0.4 dtex and a fiber length of 3 mm, and 30% of the core-shell conjugate fibers used in Example 1 was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 33 having a solid content of 0.01% and a conductivity of 3.1 $\mu$S/cm. Then, stock slurry 33 was subjected to wet paper making using a cylinder paper machine to prepare wet nonwoven fabric having a basis weight of 18 g/m$^2$. The wet nonwoven fabric was subjected to thermal treatment so that the fabric was brought into contact with a drum roll heated to 200° C. having a diameter of 1.2 m at a rate of 20 m/min to give a separator for electrochemical device or a separator for electrical double layer capacitor, having a basis weight of 18.5 g/m$^2$, a thickness of 56 $\mu$m, and a void rate of 76.3%.

Comparative Example 4

A mixture having a composition of 30% of fibrillated organic fibers 5, 20% of polyester fibers having fineness of 0.1 dtex and a fiber length of 3 mm, 20% of polyester fibers having fineness of 0.4 dtex and a fiber length of 3 mm, and 30% of the core-shell conjugate fibers used in Example 1 was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 34 having a solid content of 0.01% and a conductivity of 3.0 $\mu$S/cm. Then, stock slurry 34 was subjected to wet paper making usin cylinder paper machine to prepare wet nonwoven fabric having a basis weight of 18 g/m$^2$. The wet nonwoven fabric was subjected to thermal treatment so that the fabric was brought into contact with a drum roll heated to 200° C. having a diameter of 1.2 m at a rate of 20 m/min to give a separator for electrochemical device or a separator for electrical double layer capacitor, having a basis weight of 18.5 g/m$^2$, a thickness of 58 $\mu$m, and a void rate of 77.5%.

Example 79

A mixture having a composition of 30% of fibrillated organic fibers 1, 5% of fibrillated cellulose fibers 2, 20% of polyester fibers having fineness of 0.1 dtex and a fiber length of 3 mm, 15% of polyester fibers having fineness of 0.4 dtex and a fiber length of 3 mm, and 30% of the core-shell conjugate fibers used in Example 1 was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 35 having a solid content of 0.01% and a conductivity of 3.8 $\mu$S/cm. Then, stock slurry 35 was subjected to wet paper making using a cylinder paper machine to prepare wet nonwoven fabric having a basis weight of 18 g/m$^2$. The wet nonwoven fabric was subjected to thermal treatment so that the fabric was brought into contact with a drum roll heated to 200° C. having a diameter of 1.2 m at a rate of 20 m/min to give a separator for electrochemical device or a separator for electrical double layer capacitor, having a basis weight of 18.5 g/m$^2$, a thickness of 58 $\mu$m, and a void rate of 77.5%.

Comparative Example 1

A mixture having a composition of 50% of fibrillated organic fibers 1 and 50% of the core-shell conjugate fibers used in Example 1 was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 41 having a solid content of 0.01% and a conductivity of 5.5 $\mu$S/cm. Then, stock slurry 41 was subjected to wet paper making using a cylinder paper machine to prepare wet nonwoven fabric having a basis weight of 18 g/m$^2$. The wet nonwoven fabric was subjected to thermal treatment so that the fabric was brought into contact with a drum roll heated to 200° C. having a diameter of 1.2 m at a rate of 20 m/min to give a separator for electrochemical device or a separator for electrical double layer capacitor, having a basis weight of 19 g/m$^2$, a thickness of 60 $\mu$m, and a void rate of 77.7%.

Comparative Example 2

A mixture having a composition of 40% of fibrillated organic fibers 1, 30% of polypropylene fiber pulp refined using a double-disk refiner so as to have a Canadian standard freeness of 300 ml, and 30% of the core-shell conjugate fibers used in Example 1 was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 42 having a solid content of 0.01% and a conductivity of 4.5 μS/cm. Then, stock slurry 42 was subjected to wet paper making using a cylinder paper machine to prepare wet nonwoven fabric having a basis weight of 18 g/m$^2$. The wet nonwoven fabric was subjected to thermal treatment so that the fabric was brought into contact with a drum roll heated to 150° C. having a diameter of 1.2 m at a rate of 20 m/min to give a separator for electrochemical device or a separator for electrical double layer capacitor, having a basis weight of 20 g/m$^2$, a thickness of 62 μm, and a void rate of 71.2%.

Comparative Example 6

Hemp pulp was disintegrated by means of a pulper and then refined using a double-disk refiner to prepare pulp having a Canadian standard freeness of 100 ml. A mixture having a composition of 20% of said pulp, 50% of fibrillated organic fibers 1, and 30% of the core-shell conjugate fibers used in Example 1 was dispersed in ion-exchanged water, together with a nonionic dispersing auxiliary and a nonionic defoamer, using a pulper so that the solid content became 0.1%. The resultant dispersion was diluted with ion-exchanged water to prepare stock slurry 43 having a solid content of 0.01% and a conductivity of 5.5 μS/cm. Then, stock slurry 43 was subjected to wet paper making using a cylinder paper machine to prepare wet nonwoven fabric having a basis weight of 18 g/m$^2$. The wet nonwoven fabric was subjected to thermal treatment so that the fabric was brought into contact with a drum roll heated to 200° C. having a diameter of 1.2 m at a rate of 20 m/min to give a separator for electrochemical device or a separator for electrical double layer capacitor, having a basis weight of 18.5 g/m$^2$, a thickness of 60 μm, and a void rate of 78.1%.

Comparative Example 7

A mixture having a composition of 50% of solvent-spun cellulose fiber pulp refined using a double-disk refiner so as to have a Canadian standard freeness of 100 ml, and 50% of hemp pulp refined using a double-disk refiner so as to have a Canadian standard freeness of 200 ml was dispersed in ion-exchanged water using a pulper so that the solid content became 0.5%. The resultant dispersion was diluted with ion-exchanged water to prepare stock slurry 44 having a solid content of 0.01% and a conductivity of 3.5 μS/cm. Then, stock slurry 44 was subjected to wet paper making using a cylinder paper machine to give a separator for electrochemical device or a separator for electrical double layer capacitor, having a basis weight of 15 g/m$^2$, a thickness of 50 μm, and a void rate of 78.6%.

<Preparation of Electrochemical Device 1>

A mixture comprising 85% of activated carbon having an average particle diameter of 8 μm as an electrode active material, 7% of carbon black as a conductive material, and 8% of polytetrafluoroethylene as a binder was kneaded to prepare a sheet-form electrode having a thickness of 0.2 mm. The electrode sheets were bonded to both surfaces of an aluminum foil having a thickness of 50 μm using a conductive adhesive and calendered to prepare an electrode having an effective electrode area with the width of 105 mm and the length of 19.9 m. This electrode was used as positive and negative electrodes. The separators for electrical double layer capacitor prepared in Examples 1 to 79 and Comparative Examples 1 to 7 were individually cut into slits each having a width of 110 mm and a length of 20 m, and each slit was placed between a negative electrode and a positive electrode and spirally wound together using a winding machine to prepare spirally wound device 1. The separator was arranged in the outermost layer of each of the positive electrode and the negative electrode. Spirally wound device 1 was placed in an aluminum casing. The aluminum casing containing device 1 was slowly cooled to room temperature, and then a positive electrode lead and a negative electrode lead were respectively welded to the positive electrode terminal and negative electrode terminal provided on the casing and then the casing was sealed so that an electrolyte inlet remains open. The resultant casing containing the device was subjected to drying treatment by heating at 200° C. for 3 hours. Then, an electrolyte was introduced into the casing and the electrolyte inlet was sealed up to prepare an electrical double layer capacitor, which was referred to as electrochemical device 1. As the electrolyte, a solution prepared by dissolving $(C_2H_5)_3(CH_3)NBF_4$ in propylene carbonate so as to have a concentration of 1.5 mol/l was used.

<Preparation of Electrochemical Device 2>

The separators for electrochemical device prepared in Examples 1 to 89 and Comparative Examples 1 to 5 were individually cut into slits each having a width of 57 mm and a length of 600 mm, and each slit was placed between a negative electrode and a positive electrode and spirally wound together using a winding machine to prepare spirally wound device 2. Spirally wound device 2 was placed in a nickel-plated iron cylindrical battery casing having a diameter of 18 mm and a height of 65 mm. Then, a negative electrode lead and a positive electrode lead were respectively welded to the negative electrode terminal and positive electrode terminal. An organic electrolyte prepared by dissolving $LiPF_6$ in a mixed solvent of propylene carbonate and diethyl carbonate in a 1:1 volume ratio so as to have a concentration of 1 mol/l was introduced into the battery casing. Then, the battery casing was sealed by caulking the casing and the battery lid to prepare an organic electrolyte cylindrical battery, which was referred to as electrochemical device 2. The negative electrode used was prepared as follows. A mixture comprising 90% of coke powder having an average particle diameter of 6 μm and 10% of polytetrafluoroethylene as a binder was kneaded to prepare a negative electrode composition. Then, an appropriate amount of N-methylpyrrolidone was added to the prepared composition to form a slurry, and the slurry was applied to both surfaces of a strip-form copper foil having a thickness of 100 μm as a negative electrode current collector and dried, and then shaped by compression using a roller press machine to give a negative electrode having a thickness of 180 μm, a width of 55 mm, and a length of 556 mm. The positive electrode used was prepared as follows. A mixture comprising 90% of $LiCoO_2$ having an average particle diameter of 6 μm, 6% of conductive graphite, and 4% of polytetrafluoroethylene as a binder was kneaded to prepare a positive electrode composition. Then, the prepared composition was applied to both surfaces of a strip-form aluminum foil having a thickness of 20 μm as a positive electrode current collector and dried, and then shaped by compression using a roller press machine to give a positive electrode having a thickness of 150 μm, a width of 53 mm, and a length of 528 mm.

With respect to each of the separators for electrochemical device and separators for electrical double layer capacitor prepared in Examples 1 to 89 and Comparative Examples 1 to 5, and electrochemical devices 1 and 2 comprising each separator, various measurements were carried out in accordance with the below-described test methods, and the results are shown in Tables below.

<Moisture Absorption>

Each separator sample was dried in vacuum at 200° C. for one hour and weighed. It was then allowed to stand in an atmosphere at 20° C. at 65% RH for 24 hours and weighted, and an increase in the weight was taken as a moisture absorption.

<Heat Shrinkage Degree>

Each separator sample was cut into a size of 15 cm×10 cm and placed on an aluminum plate, and the two sides perpendicular to the lengthwise direction were individually fixed by clips and allowed to stand in an isotherm dryer set at 200° C. for 3 hours. The size of the resultant sample in the crosswise direction was measured, and a changing ratio of size due to shrinkage based on the original size was determined and taken as a heat shrinkage degree (%)

<Tensile Strength>

Each separator sample was cut in the direction parallel to the paper making direction into 10 strips each having a width of 50 mm, and a tensile strength was measured with respect to the 10 strips using a tensile tester and an average value was obtained.

<Puncture Strength>

A needle having a diameter of 1 mm and having R on its tip was disposed on each separator sample at a right angle and permitted to descend at a rate of 1 mm/s, and a load at which the needle penetrates the separator sample was taken as a puncture strength, and an average value of 20 measurements was obtained.

<Maximum Pore Diameter>

A maximum pore diameter was measured in accordance with the bubble point method defined in ASTM-F-80.

<Gurley Air Permeability>

With respect to each separator sample which was fixed to and contacted with a circular hole having an outer diameter of 28.6 mm, a period of time until 100 ml of air permeated the separator sample was measured using the Gurley air permeability meter defined in JIS P8117.

<Extract Solution Conductivity>

2 g of each separator sample was weighed, and immersed in ion-exchanged water and heated to 80° C. for one hour to extract the ion species contained in the separator. Then, the extract solution was cooled to 25° C., and a conductivity of the cooled extract solution was measured.

<Center Plane Average Surface Roughness>

Each separator sample was placed on a sample holder and fixed using a magnet to measure a center plane average surface roughness SRa using a stylus-type three-dimensional surface roughness tester. A stylus having a 5 $\mu$m tip was used, and a measurement was conducted with respect to the region of 10 mm in the X axis direction and 1 mm in the Y axis direction, at a rate of 0.3 mm/s and at a cut off of 0.8 mm. The measurement pitch in the Y axis direction was 200 $\mu$m. The measurement was performed with respect to each of the surface and the back surface per separator sample, and a larger SRa value was used.

<Electrolyte Holding Rate>

The weight ($W_1$) of a separator sample cut out into a size of 15 cm×10 cm was measured. Then, the separator sample was immersed in an electrolyte for one minute, and then the sample was taken out using forceps and then hung. At a point when the electrolyte did not drop any more from the sample, the weight ($W_2$) of the sample was measured. Using formula 1 below, an electrolyte holding rate (%) based on the weight of the separator itself was determined. As an electrolyte, the electrolyte used in <Preparation of electrochemical device 1> was used.

$$\text{Electrolyte holding rate (\%)}=(W_2-W_1)/W_1\times 100$$

<Winding Failure Rate>

In the preparation of 100 electrochemical devices 1 in <Preparation of electrochemical device 1> above, the number of the separator(s) for electrochemical device which had a problem of winding properties, for example, which suffered damage or slipping during the winding operation, was determined, and taken as a winding failure rate which was used as an index of the winding properties.

<Electrolyte Absorption Rate>

Each separator sample was cut out into a strip having a width of 20 mm and a length of 150 mm and then hung. The 10 mm lower end portion of the sample was immersed in an electrolyte for one minute, and then a height of the electrolyte absorbed in the separator sample from the bottom was measured, and taken as an electrolyte absorption rate (mm/min). As an electrolyte, the electrolyte used in <Preparation of electrochemical device 1> was used.

<Internal Short-circuit Failure Rate 1>

A direct voltage of 2.5 V was applied to each of electrochemical devices 1 individually comprising the separators for electrochemical device prepared in Examples 1 to 79 and Comparative Examples 1 to 7 for 72 hours, and then each device was charged until the voltage became 2.5 V. A leakage current was measured immediately after charging, and a device exhibiting a leakage current of 10 mA or more was judged to have an internal short-circuit failure. The number of a device or devices having an internal short-circuit failure per 100 devices was determined and taken as internal short-circuit failure rate 1.

<Internal Short-circuit Failure Rate 2>

Each of electrochemical devices 2 individually comprising the separators for electrochemical device prepared in Examples 1 to 79 and Comparative Examples 1 to 7 was charged at a constant current of 1 CmA until the voltage became 4.2 V, and, after the voltage reached 4.2 V, constant voltage charging was conducted so that the charging was completed in 2.5 hours in total. After completion of the charging, a device exhibiting a circuit voltage of 0 V or less than 3 V was judged to have an internal short-circuit failure. The number of a device or devices having an internal short-circuit failure per 100 devices was determined and taken as internal short-circuit failure rate 2.

<Internal Resistance>

With respect to each of electrochemical devices 1 individually comprising the separators for electrochemical device prepared in Examples 1 to 79 and Comparative Examples 1 to 7 an internal resistance was measured, and the measurement values are shown in the Tables below.

<Capacity Exhibiting Rate>

A direct voltage of 2.5 V was applied to each of electrochemical devices 1 individually comprising the separators for electrochemical device prepared in Examples 1 to 79 and Comparative Examples 1 to 7 for 72 hours, and then each device was charged until the voltage became 2.5 V and discharged at a discharge current of 10 A to determine an initial discharge capacity. A percentage of the initial discharge capacity to the theoretical discharge capacity was taken as a capacity exhibiting rate, and an average value with respect to 100 devices was shown in the Tables below.

<Capacity Changing Rate>

With respect to each of electrochemical devices 1 individually comprising the separators for electrochemical device prepared in Examples 1 to 79 and Comparative Examples 1 to 7, a capacity changing rate was determined between before and after subjecting to conditions at 70° C. at a voltage of 2.5 V for 1,000 hours, and used as an index of the life of electrochemical device 1. The smaller the capacity changing rate, the longer the life of electrochemical device 1.

TABLE 1

| Example | Moisture absorption % | Heat shrinkage degree % | Tensile strength kg/50 mm | Puncture strength g | Maximum pore diameter μm |
|---|---|---|---|---|---|
| Example 1 | 1.53 | 0.8 | 2.0 | 184 | 2.7 |
| Example 2 | 1.51 | 0.8 | 2.0 | 159 | 2.1 |
| Comparative Example 5 | 1.50 | 0.3 | 5.1 | 375 | 0.7 |
| Example 4 | 1.55 | 4.4 | 1.1 | 136 | 2.7 |
| Example 5 | 1.51 | 0.8 | 2.0 | 183 | 2.7 |
| Example 6 | 2.15 | 1.0 | 4.2 | 214 | 1.8 |
| Example 7 | 2.14 | 1.0 | 4.2 | 203 | 1.6 |
| Example 8 | 2.34 | 4.6 | 1.9 | 168 | 1.8 |
| Example 9 | 1.64 | 0.9 | 5.0 | 235 | 2.2 |
| Example 10 | 2.12 | 0.5 | 1.8 | 200 | 1.6 |
| Example 11 | 2.10 | 0.5 | 1.8 | 178 | 1.4 |
| Example 12 | 2.15 | 4.0 | 1.0 | 149 | 1.6 |
| Example 13 | 0.51 | 0.4 | 2.6 | 205 | 6.7 |
| Example 14 | 1.25 | 0.2 | 2.3 | 172 | 5.7 |
| Example 15 | 2.31 | 0.5 | 4.4 | 255 | 1.9 |
| Example 16 | 2.31 | 0.5 | 4.4 | 241 | 1.7 |
| Example 17 | 3.11 | 0.6 | 1.9 | 168 | 2.2 |
| Example 18 | 3.10 | 0.6 | 1.9 | 139 | 1.9 |
| Example 19 | 3.17 | 0.9 | 4.1 | 190 | 1.7 |
| Example 20 | 3.16 | 0.9 | 4.1 | 179 | 1.5 |
| Example 21 | 4.35 | 1.1 | 2.7 | 187 | 1.5 |
| Example 22 | 3.01 | 0.5 | 2.1 | 160 | 2.0 |
| Example 23 | 3.66 | 0.5 | 2.5 | 194 | 1.6 |
| Example 24 | 3.66 | 0.5 | 2.5 | 180 | 1.3 |
| Example 25 | 2.65 | 0.7 | 3.8 | 226 | 1.4 |
| Example 26 | 2.64 | 0.7 | 3.8 | 212 | 1.0 |
| Example 27 | 2.51 | 0.5 | 1.8 | 143 | 1.8 |
| Example 28 | 2.51 | 0.5 | 1.8 | 120 | 1.5 |
| Example 29 | 1.02 | 0.7 | 2.1 | 196 | 6.5 |
| Example 30 | 1.02 | 0.7 | 2.1 | 170 | 3.8 |
| Example 31 | 3.44 | 0.8 | 1.3 | 114 | 1.4 |
| Example 32 | 3.43 | 0.8 | 1.2 | 107 | 1.0 |
| Example 35 | 3.38 | 0.9 | 1.3 | 115 | 1.5 |
| Example 36 | 2.15 | 2.1 | 2.0 | 182 | 2.9 |
| Example 37 | 2.15 | 2.1 | 2.0 | 161 | 2.3 |
| Example 40 | 1.52 | 0.8 | 2.0 | 178 | 2.7 |
| Example 41 | 1.52 | 0.8 | 2.0 | 152 | 2.2 |
| Example 42 | 2.17 | 1.0 | 4.2 | 208 | 1.8 |
| Example 43 | 2.16 | 1.0 | 4.2 | 196 | 1.6 |
| Example 44 | 3.63 | 0.5 | 2.6 | 197 | 1.6 |
| Example 45 | 2.11 | 1.0 | 4.4 | 210 | 1.9 |
| Example 46 | 2.10 | 1.0 | 4.4 | 200 | 1.6 |
| Example 47 | 3.60 | 0.5 | 3.0 | 187 | 1.8 |
| Example 48 | 3.60 | 0.5 | 3.0 | 171 | 1.5 |
| Example 49 | 3.17 | 0.6 | 1.9 | 165 | 2.2 |
| Example 50 | 3.16 | 0.6 | 1.9 | 132 | 1.9 |
| Example 51 | 0.05 | 0.7 | 2.5 | 190 | 2.3 |
| Example 52 | 0.04 | 0.7 | 2.5 | 162 | 2.0 |
| Example 54 | 1.01 | 0.9 | 5.2 | 269 | 1.6 |
| Example 55 | 1.06 | 0.9 | 5.3 | 272 | 1.6 |
| Example 56 | 1.12 | 0.5 | 3.5 | 204 | 1.5 |
| Example 57 | 1.12 | 0.5 | 3.5 | 190 | 1.1 |
| Example 58 | 1.12 | 0.5 | 3.5 | 201 | 1.5 |
| Example 59 | 0.05 | 0.5 | 2.1 | 175 | 1.5 |
| Example 60 | 0.05 | 0.5 | 2.1 | 150 | 1.2 |
| Example 63 | 0.47 | 2.4 | 2.3 | 211 | 1.9 |
| Example 64 | 0.47 | 2.4 | 2.3 | 188 | 1.7 |
| Example 65 | 1.22 | 1.9 | 3.7 | 192 | 1.5 |
| Example 66 | 1.21 | 1.9 | 3.7 | 181 | 1.1 |
| Example 69 | 1.56 | 1.4 | 1.2 | 117 | 1.4 |
| Example 70 | 1.56 | 1.4 | 1.2 | 110 | 0.9 |
| Example 71 | 0.05 | 0.7 | 2.5 | 185 | 2.3 |
| Example 72 | 0.05 | 0.7 | 2.5 | 158 | 2.0 |
| Example 73 | 1.11 | 0.5 | 3.6 | 202 | 1.5 |
| Example 74 | 1.11 | 0.5 | 3.6 | 191 | 1.1 |
| Example 75 | 1.10 | 0.7 | 3.7 | 196 | 1.8 |
| Example 76 | 1.11 | 0.7 | 3.7 | 182 | 1.5 |
| Comparative Example 3 | 1.52 | 0.8 | 2.5 | 161 | 7.2 |

TABLE 1-continued

| Example | Moisture absorption % | Heat shrinkage degree % | Tensile strength kg/50 mm | Puncture strength g | Maximum pore diameter μm |
|---|---|---|---|---|---|
| Comparative Example 4 | 1.52 | 0.8 | 1.6 | 142 | 8.5 |
| Example 79 | 2.14 | 0.8 | 1.9 | 209 | 1.9 |
| Comp. Exple. 1 | 2.58 | 1.3 | 4.0 | 146 | 9.3 |
| Comp. Exple. 2 | 2.13 | 5.5 | 2.3 | 290 | 2.3 |
| Comp. Exple. 6 | 5.11 | 2.1 | 2.6 | 166 | 2.0 |
| Comp. Exple. 7 | 13.4 | 3.5 | 3.2 | 50 | 2.4 |

TABLE 2

| Example | Gurley air permeability s/100 ml | Extract solution conductivity μS/cm | Center plane average surface roughness SRa | Electrolyte holding rate % | Electrolyte absorption rate mm/min |
|---|---|---|---|---|---|
| Example 1 | 2.2 | 3.7 | 7.7 | 274 | 10 |
| Example 2 | 3.6 | 3.5 | 2.6 | 250 | 7 |
| Comp. Ex-. ple. 5 | 23.1 | 3.5 | 1.5 | 153 | 3 |
| Example 4 | 2.2 | 4.0 | 12.0 | 274 | 10 |
| Example 5 | 2.2 | 33.5 | 7.2 | 273 | 11 |
| Example 6 | 4.0 | 4.2 | 6.8 | 270 | 10 |
| Example 7 | 4.7 | 4.1 | 1.8 | 253 | 7 |
| Example 8 | 4.0 | 4.5 | 11.2 | 270 | 10 |
| Example 9 | 2.8 | 4.9 | 6.5 | 268 | 10 |
| Example 10 | 4.6 | 5.8 | 10.0 | 287 | 13 |
| Example 11 | 6.9 | 5.6 | 2.4 | 265 | 9 |
| Example 12 | 4.7 | 6.0 | 16.5 | 290 | 13 |
| Example 13 | 0.4 | 10.0 | 9.0 | 303 | 15 |
| Example 14 | 0.5 | 7.1 | 13.6 | 316 | 18 |
| Example 15 | 3.4 | 4.0 | 5.9 | 277 | 14 |
| Example 16 | 4.2 | 3.7 | 1.7 | 265 | 10 |
| Example 17 | 2.7 | 3.9 | 9.4 | 275 | 10 |
| Example 18 | 3.4 | 3.8 | 2.4 | 262 | 7 |
| Example 19 | 4.4 | 29.1 | 7.8 | 268 | 10 |
| Example 20 | 5.0 | 28.5 | 3.2 | 258 | 7 |
| Example 21 | 5.1 | 20.3 | 7.5 | 269 | 9 |
| Example 22 | 3.5 | 4.1 | 9.8 | 280 | 14 |
| Example 23 | 4.7 | 7.5 | 8.0 | 276 | 14 |
| Example 24 | 8.5 | 7.4 | 2.5 | 255 | 10 |
| Example 25 | 6.8 | 15.7 | 7.1 | 271 | 10 |
| Example 26 | 16.5 | 15.6 | 1.9 | 251 | 7 |
| Example 27 | 3.9 | 5.7 | 10.9 | 283 | 10 |
| Example 28 | 4.9 | 5.5 | 2.8 | 266 | 6 |
| Example 29 | 0.4 | 8.4 | 10.3 | 275 | 12 |
| Example 30 | 3.8 | 8.2 | 2.5 | 258 | 9 |
| Example 31 | 6.8 | 3.9 | 7.3 | 322 | 12 |
| Example 32 | 16.5 | 3.6 | 2.2 | 308 | 9 |
| Example 35 | 5.0 | 6.5 | 7.2 | 320 | 11 |
| Example 36 | 1.9 | 25.4 | 6.9 | 261 | 10 |
| Example 37 | 2.4 | 25.2 | 2.1 | 245 | 7 |
| Example 40 | 2.2 | 3.6 | 9.6 | 275 | 11 |
| Example 41 | 2.8 | 3.5 | 3.0 | 251 | 7 |
| Example 42 | 3.8 | 4.3 | 9.2 | 271 | 11 |
| Example 43 | 4.5 | 4.0 | 2.8 | 255 | 7 |
| Example 44 | 4.6 | 7.5 | 8.8 | 276 | 14 |
| Example 45 | 3.5 | 4.2 | 11.3 | 272 | 18 |
| Example 46 | 4.5 | 4.1 | 3.1 | 255 | 13 |
| Example 47 | 3.9 | 7.0 | 11.6 | 275 | 21 |
| Example 48 | 5.1 | 6.7 | 3.2 | 254 | 14 |
| Example 49 | 2.7 | 3.9 | 13.5 | 274 | 24 |
| Example 50 | 3.4 | 3.9 | 3.6 | 265 | 16 |
| Example 51 | 2.4 | 7.7 | 7.9 | 276 | 11 |
| Example 52 | 3.2 | 7.6 | 2.6 | 258 | 7 |
| Example 54 | 4.5 | 8.0 | 6.7 | 272 | 10 |

TABLE 2-continued

| Example | Gurley air permeability s/100 ml | Extract solution conductivity μS/cm | Center plane average surface roughness SRa | Electrolyte holding rate % | Electrolyte absorption rate mm/min |
|---|---|---|---|---|---|
| Example 55 | 4.6 | 10.6 | 6.9 | 271 | 10 |
| Example 56 | 7.0 | 15.8 | 7.2 | 293 | 15 |
| Example 57 | 13.4 | 15.7 | 2.2 | 283 | 11 |
| Example 58 | 7.0 | 34.2 | 7.4 | 295 | 15 |
| Example 59 | 5.0 | 4.7 | 8.5 | 280 | 10 |
| Example 60 | 10.8 | 4.7 | 2.9 | 260 | 6 |
| Example 63 | 3.6 | 28.8 | 7.7 | 281 | 10 |
| Example 64 | 4.1 | 28.5 | 2.5 | 269 | 7 |
| Example 65 | 5.0 | 10.0 | 7.1 | 276 | 9 |
| Example 66 | 13.6 | 9.9 | 2.3 | 262 | 6 |
| Example 69 | 7.0 | 5.6 | 7.0 | 281 | 14 |
| Example 70 | 19.2 | 5.6 | 2.2 | 267 | 10 |
| Example 71 | 2.4 | 7.8 | 10.4 | 277 | 11 |
| Example 72 | 3.1 | 7.3 | 2.5 | 260 | 7 |
| Example 73 | 5.2 | 15.5 | 11.4 | 290 | 21 |
| Example 74 | 13.7 | 15.1 | 2.3 | 281 | 15 |
| Example 75 | 4.1 | 15.7 | 12.8 | 290 | 26 |
| Example 76 | 5.1 | 15.4 | 2.6 | 280 | 18 |
| Comp. Exple. 3 | 0.4 | 3.6 | 10.2 | 266 | 10 |
| Comp. Exple. 4 | 0.2 | 3.6 | 12.7 | 241 | 10 |
| Example 79 | 3.5 | 4.8 | 8.9 | 271 | 10 |
| Comp. Exple. 1 | 0.2 | 6.8 | 15.9 | 251 | 10 |
| Comp. Exple. 2 | 2.5 | 5.2 | 15.0 | 185 | 5 |
| Comp. Exple. 6 | 3.1 | 6.2 | 17.5 | 256 | 11 |
| Comp. Exple. 7 | 2.2 | 4.1 | 21.2 | 215 | 9 |

TABLE 3

| Example | Internal short-circuit failure rate 1 % | Internal short-circuit failure rate 2 % | Winding failure rate % | Internal resistance Ω | Capacity exhibiting rate % | Capacity changing rate % |
|---|---|---|---|---|---|---|
| Example 1 | 0 | 0 | 0 | 16.0 | 96.6 | 6.1 |
| Example 2 | 0 | 0 | 0 | 17.4 | 96.6 | 6.9 |
| Comp. Exple. 5 | 0 | 0 | 0 | 30.3 | 80.2 | 13.6 |
| Example 4 | 0 | 0 | 0 | 16.0 | 96.6 | 6.6 |
| Example 5 | 0 | 0 | 0 | 22.5 | 95.1 | 12.9 |
| Example 6 | 0 | 0 | 0 | 16.1 | 96.5 | 6.5 |
| Example 7 | 0 | 0 | 0 | 17.2 | 95.4 | 6.7 |
| Example 8 | 0 | 0 | 0 | 16.1 | 96.5 | 6.4 |
| Example 9 | 0 | 0 | 0 | 16.6 | 96.1 | 6.7 |
| Example 10 | 0 | 0 | 0 | 15.3 | 98.0 | 5.7 |
| Example 11 | 0 | 0 | 0 | 16.5 | 96.1 | 6.0 |
| Example 12 | 0 | 0 | 0 | 14.5 | 98.4 | 5.6 |
| Example 13 | 3 | 9 | 0 | 14.3 | 98.5 | 7.5 |
| Example 14 | 0 | 0 | 0 | 14.0 | 98.5 | 5.6 |
| Example 15 | 0 | 0 | 0 | 16.0 | 96.5 | 5.8 |
| Example 16 | 0 | 0 | 0 | 16.6 | 96.0 | 6.3 |
| Example 17 | 0 | 0 | 0 | 16.1 | 96.6 | 6.1 |
| Example 18 | 0 | 0 | 0 | 16.9 | 95.9 | 6.3 |
| Example 19 | 0 | 0 | 0 | 16.6 | 95.9 | 11.6 |
| Example 20 | 0 | 0 | 0 | 17.5 | 95.0 | 11.6 |
| Example 21 | 0 | 0 | 0 | 16.5 | 96.3 | 9.7 |
| Example 22 | 0 | 0 | 0 | 15.5 | 97.8 | 5.8 |
| Example 23 | 0 | 0 | 0 | 16.0 | 96.3 | 6.4 |
| Example 24 | 0 | 0 | 0 | 17.6 | 95.2 | 7.3 |
| Example 25 | 0 | 0 | 0 | 16.1 | 96.1 | 8.4 |
| Example 26 | 0 | 0 | 0 | 17.8 | 94.9 | 8.4 |
| Example 27 | 0 | 0 | 0 | 15.2 | 97.9 | 5.8 |

TABLE 3-continued

| Example | Internal short-circuit failure rate 1 % | Internal short-circuit failure rate 2 % | Winding failure rate % | Internal resistance Ω | Capacity exhibiting rate % | Capacity changing rate % |
|---|---|---|---|---|---|---|
| Example 28 | 0 | 0 | 0 | 16.6 | 96.0 | 6.6 |
| Example 29 | 3 | 8 | 0 | 16.0 | 96.5 | 8.5 |
| Example 30 | 0 | 0 | 0 | 17.0 | 95.5 | 7.1 |
| Example 31 | 0 | 0 | 0 | 14.0 | 98.6 | 5.5 |
| Example 32 | 0 | 0 | 0 | 14.2 | 98.5 | 5.5 |
| Example 35 | 0 | 0 | 0 | 14.0 | 98.6 | 5.5 |
| Example 36 | 0 | 0 | 0 | 16.5 | 96.0 | 11.0 |
| Example 37 | 0 | 0 | 0 | 17.9 | 94.8 | 11.0 |
| Example 40 | 0 | 0 | 0 | 16.0 | 96.3 | 6.0 |
| Example 41 | 0 | 0 | 0 | 17.5 | 95.3 | 7.3 |
| Example 42 | 0 | 0 | 0 | 16.1 | 96.0 | 6.1 |
| Example 43 | 0 | 0 | 0 | 17.4 | 95.2 | 7.0 |
| Example 44 | 0 | 0 | 0 | 16.2 | 96.1 | 6.2 |
| Example 45 | 0 | 0 | 0 | 16.3 | 96.0 | 6.4 |
| Example 46 | 0 | 0 | 0 | 17.3 | 95.1 | 7.5 |
| Example 47 | 0 | 0 | 0 | 16.2 | 95.9 | 6.0 |
| Example 48 | 0 | 0 | 0 | 17.2 | 95.0 | 7.0 |
| Example 49 | 0 | 0 | 0 | 16.0 | 96.1 | 6.5 |
| Example 50 | 0 | 0 | 0 | 16.6 | 96.0 | 6.4 |
| Example 51 | 0 | 0 | 0 | 16.5 | 96.0 | 6.5 |
| Example 52 | 0 | 0 | 0 | 17.6 | 94.9 | 7.8 |
| Example 54 | 0 | 0 | 0 | 15.8 | 97.7 | 5.9 |
| Example 55 | 0 | 0 | 0 | 15.8 | 97.8 | 6.0 |
| Example 56 | 0 | 0 | 0 | 14.8 | 98.0 | 8.5 |
| Example 57 | 0 | 0 | 0 | 15.3 | 97.5 | 8.5 |
| Example 58 | 0 | 0 | 0 | 23.1 | 95.0 | 13.3 |
| Example 59 | 0 | 0 | 0 | 15.3 | 98.0 | 5.5 |
| Example 60 | 0 | 0 | 0 | 16.5 | 96.1 | 6.4 |
| Example 63 | 0 | 0 | 0 | 15.3 | 97.5 | 11.0 |
| Example 64 | 0 | 0 | 0 | 17.0 | 95.1 | 10.8 |
| Example 65 | 0 | 0 | 0 | 16.3 | 96.0 | 6.1 |
| Example 66 | 0 | 0 | 0 | 16.8 | 96.0 | 6.2 |
| Example 69 | 0 | 0 | 0 | 15.4 | 97.9 | 5.6 |
| Example 70 | 0 | 0 | 0 | 16.6 | 96.1 | 6.2 |
| Example 71 | 0 | 0 | 0 | 16.0 | 96.3 | 6.0 |
| Example 72 | 0 | 0 | 0 | 16.8 | 95.9 | 6.6 |
| Example 73 | 0 | 0 | 0 | 15.0 | 98.0 | 8.1 |
| Example 74 | 0 | 0 | 0 | 15.4 | 97.7 | 8.1 |
| Example 75 | 0 | 0 | 0 | 14.5 | 98.4 | 8.2 |
| Example 76 | 0 | 0 | 0 | 15.5 | 97.5 | 8.1 |
| Comp. Exple. 3 | 5 | 13 | 0 | 16.5 | 87.1 | 8.6 |
| Comp. Exple. 4 | 9 | 16 | 0 | 17.1 | 82.0 | 9.9 |
| Example 79 | 0 | 0 | 0 | 16.3 | 96.4 | 6.2 |
| Comp. Exple. 1 | 15 | 26 | 0 | 18.0 | 84.3 | 14.5 |
| Comp. Exple. 2 | 0 | 0 | 0 | 38.7 | 75.2 | 15.6 |
| Comp. Exple. 6 | 0 | 0 | 0 | 17.3 | 93.1 | 15.5 |
| Comp. Exple. 7 | 0 | 0 | 10 | 21.7 | 85.6 | 17.7 |

Evaluation:

As is apparent from the results shown in Tables 1 to 3, each separator for electrochemical device or separators for electrical double layer capacitor prepared in Examples 1 to 89 in the present invention had excellent electrolyte holding properties and excellent internal short-circuit preventing properties, and the electrochemical devices comprising each separator had a low internal resistance and a high capacity exhibiting rate as well as a low capacity changing rate, since each of the separators comprises wet nonwoven fabric comprising at least one kind of organic fibers which are at least partially fibrillated into a fiber diameter of 1 μm or less, and at least one kind of unfibrillated organic fibers having fineness of 0.5 dtex or less. Especially, each of the separators for electrochemical device or separators for electrical double layer capacitor prepared in Examples 1 to 76 and 79 comprises fibrillated organic fibers having an average fiber length of 0.3 to 2 mm. Therefore, each separator had a small pore diameter and thus had excellent internal short-circuit preventing properties.

In each of the separators for electrochemical device or separators for electrical double layer capacitor prepared in Examples 1 to 79 in the present invention, part of or all of the organic fibers which are at least partially fibrillated into a fiber diameter of 1 μm or less have a melting point or a heat decomposition temperature of 250° C. or higher. Therefore, each separator had such excellent heat resistance that the separator did not markedly shrink by heat in a drying step at about 200° C.

In each of the separators for electrochemical device or separators for electrical double layer capacitor prepared in Examples 1 to 79 in the present invention, at least part of the unfibrillated organic fibers having fineness of 0.5 dtex or less comprises a component having a melting point or a heat decomposition temperature of 200° C. or higher. Therefore, such fibers were not completely melted or did not markedly shrink by heat even in a drying step at about 200° C., and thus they contributed to excellent heat resistance of the separator.

Each of the separators for electrochemical device or separators for electrical double layer capacitor prepared in Examples 6 to 9, 14 to 16, 19 to 21, 23 to 26, 31, 32, 35, 42 to 48, 54 to 58, 65, 66, 69, 70, 73 to 76, 79 in the present invention comprises fibrillated cellulose fibers or bacterial cellulose. Therefore, each separator was remarkably improved in puncture strength. Further, by virtue of the fibrillated cellulose fibers or bacterial cellulose, each separator had a small maximum pore diameter.

Each of the separators for electrochemical device or separators for electrical double layer capacitor prepared in Examples 10 to 16, 22 to 24, 44, 56 to 58, and 73 to 76 in the present invention comprises microglass fiber having an average fiber diameter of 3 μm or less. Therefore, each separator was advantageous not only in that the heat shrinkage degree was extremely small and the dimensional stability against heat was excellent, but also in that the separator had a high affinity with the electrolyte and therefore had excellent electrolyte holding properties, and the electrochemical devices comprising each separator exhibited higher capacity exhibiting rate.

Each of the separators for electrochemical device or separators for electrical double layer capacitor prepared in Examples 1 to 30, 36, 37, 40 to 52, 54 to 66, 71 to 76 and 79 in the present invention comprises core-shell conjugate fibers having fineness of 3 dtex or less and comprising a core portion comprising a component having a melting point of 200° C. or higher and a shell portion comprising a component having a melting point of lower than 200° C. Therefore, each separator had high tensile strength and high puncture strength. Further, each separator had such excellent heat resistance that the core portion having a melting point of 200° C. or higher was able to maintain the fiber form even in a drying step at about 200° C.

Each of the separators for electrochemical device or separators for electrical double layer capacitor prepared in Examples 1, 2, 4 to 12, 14 to 28, 30 to 32, 35 to 37, 40 to 52, 54 to 60, 63 to 66, 69 to 76 and 79 in the present invention has a maximum pore diameter of 0.9 to 6 μm. Therefore, each separator was advantageous in that the electrode active material did not penetrate the separator and thus caused no internal short-circuit.

Each of the separators for electrochemical device or separators for electrical double layer capacitor prepared in Examples 1, 2, 4 to 12, 14 to 28, 30 to 32, 35 to 37, 40 to 52, 54 to 60, 63 to 66, 69 to 76 and 79 in the present invention has a Gurley air permeability of 0.5 s/100 ml to 20 s/100 ml. Therefore, each separator had excellent ion permeability, and thus the separator contributed to lowering of the internal resistance of the electrochemical device.

Each of the separators for electrochemical device or separators for electrical double layer capacitor prepared in Examples 1, 2, 4 to 32, 35 to 37, 40 to 52, 54 to 60, 63 to 66, 69 to 76 and 79 in the present invention has a void rate of 65 to 85%. Therefore, each separator had excellent ion permeability, and thus the separator contributed to lowering of the internal resistance of the electrochemical device.

Each of the separators for electrochemical device or separators for electrical double layer capacitor prepared in Examples 1, 2, 4, 6 to 32, 35 to 37, 40 to 52, 54 to 57, 59 to 60, 63 to 66, 69 to 76 and 76 in the present invention exhibits an extract solution conductivity of 30 μS/cm or less. Therefore, the electrochemical devices comprising each separator had especially small capacity changing rate, and thus had a prolonged life.

Each of the separators for electrochemical device or separators for electrical double layer capacitor prepared in Examples 1 to 89 in the present invention has a center plane average surface roughness of 20 μm or less. Therefore, each separator exhibited excellent adhesion to electrodes and excellent winding properties.

Each of the separators for electrochemical device or separators for electrical double layer capacitor prepared in Examples 1, 2, 4, 6 to 32, 35 to 37, 40 to 52, 54 to 57, 59 to 60, 63 to 66, 69 to 76 and 79 in the present invention was prepared by wet paper making using a stock slurry having a conductivity adjusted to 30 μS/cm or less, and therefore advantageously had a low extract solution conductivity.

Each of the separators for electrochemical device or separators for electrical double layer capacitor prepared in Examples 1 to 79 in the present invention has a tensile strength in a longitudinal direction of 1 kg/50 mm or more and a puncture strength of 100 g or more. Therefore, each separator suffered neither breakage nor puncture upon winding.

Each of the separators for electrochemical device or separators for electrical double layer capacitor prepared in Examples 1 to 79 in the present invention has a moisture absorption of less than 5% as measured after the separator is dried at any temperature ranging from 150 to 210° C. for one hour or longer and then allowed to stand in an atmosphere at 20° C. at 65% RH for 24 hours or longer. Therefore, each separator was able to be dried sufficiently even in a short time in a drying step at 200° C., and the electrochemical devices comprising each separator had high capacity exhibiting rate. Especially, in each of the separators for electrochemical device or separators for electrical double layer capacitor prepared in Examples 51 to 76 in the present invention, the fibrillated liquid crystalline polymer fibers comprise totally aromatic polyester fibers. Therefore, each separator had an extremely low moisture absorption and exhibited excellent drying efficiency.

Each of the separators for electrochemical device or separators for electrical double layer capacitor prepared in Examples 1 to 79 in the present invention has a heat shrinkage degree of less than 5% as measured after the separator is allowed to stand in an atmosphere at 150 to 210° C. for one hour or longer. Therefore, even when the separator was dried at a high temperature together with electrodes, the electrodes were not brought into contact with each other, whereby no short-circuit was caused. Further, each separator did not swell after drying and was able to be placed in a casing for electrochemical device without any problem.

Each of the separators for electrochemical device or separators for electrical double layer capacitor prepared in Examples 40 to 50 and 71 to 76 in the present invention has a multilayer structure. Therefore, each separator exhibited an effect of reducing formation of pinholes.

Each of the separators for electrochemical device or separators for electrical double layer capacitor prepared in Examples 45 to 50 and 73 to 76 in the present invention has a multilayer structure comprising relatively higher and lower density layers. Therefore, each separator exhibited a large electrolyte absorption rate and thus suggested that the separator possibly could attribute to improvement of the production efficiency of the electrochemical device.

Each of the separators for electrochemical device or separators for electrical double layer capacitor prepared in Examples 1 to 2, 5 to 7, 9 to 11, and 13 to 32, 35 to 37, 40 to 52, 54 to 60, 63 to 66, 69 to 76 and 79 in the present in the present invention is subjected to thermal treatment at 150 to 250° C. Therefore, each separator had larger puncture strength as compared to a separator without being thermally treated. Further, the thermal treatment was carried out by means of contacting the both surfaces of the wet nonwoven fabric with a heated roll for 5 seconds or longer, therefore, the effect of the thermal treatment was significant.

Each of the separators for electrochemical device or separators for electrical double layer capacitor prepared in Examples 2, 7, 11, 16, 18, 20, 24, 26, 28, 30, 32, 37, 41, 43, 46, 48, 50, 52, 57, 60, 62, 64, 66, 70, 72, 74, and 76, in the present invention is calendered. Therefore, each separator had extremely high surface smoothness and excellent winding properties with electrodes.

The separator for electrochemical device or separator for electrical double layer capacitor prepared in Comparative Example 1 does not contain unfibrillated organic fibers having fineness of 0.5 dtex or less. Therefore, the separator not only had a poor yield of fibrillated organic fibers 1 and poor texture as well as poor surface smoothness, but also had a large pore diameter, and an electrochemical device comprising the separator had a high internal short-circuit failure rate.

The separator for electrochemical device or separator for electrical double layer capacitor prepared in Comparative Example 2 contains 30% of polypropylene fiber pulp having a low melting point. Therefore, the pulp was melted in a drying step at 200° C. to form a film, resulting in a poor electrolyte holding properties of the separator, and thus, an electrochemical device comprising the separator had an extremely high internal resistance.

The separator for electrochemical device or separator for electrical double layer capacitor prepared in Comparative Example 6 contains 20% of hemp pulp. Therefore, the separator had slightly high moisture absorption, and thus was not dried sufficiently by a drying treatment at 200° C. for 3 hours, and an electrochemical device comprising the separator had a slightly low capacity exhibiting rate and a large capacity changing rate, which means a short life.

The separator for electrochemical device or separator for electrical double layer capacitor prepared in Comparative Example 7 comprises 100% of cellulose fibers. Therefore, the separator had extremely high moisture absorption, and thus was not dried sufficiently by a drying treatment at 200° C. for 3 hours, and an electrochemical device comprising the separator had a low capacity exhibiting rate and a large capacity changing rate, which means a short life.

The separator for electrochemical device or separator for electrical double layer capacitor prepared in Comparative Example 5 contains 40% of glass fiber having an average fiber diameter of 6 μm. Therefore, the separator had poor texture and poor surface smoothness and posed a problem relating winding properties. Further, the separator had a large pore diameter and thus, an electrochemical device comprising the separator had an extremely high internal short-circuit failure rate, a low capacity exhibiting rate, and a large capacity changing rate, which means a short life.

What is claimed is:

1. A separator for an electrochemical device, which comprises:

a wet nonwoven fabric comprising one or more kinds of fibrillated liquid crystalline polymeric fibers which have at least partially a fiber diameter of 0.0004 μm to 1 μm, have a melting point or a thermal decomposition temperature of 250 C to 650° C. and have an average fiber length of 0.3 mm to 2 mm, and one or more kinds of unfibrillated organic fibers having a fineness of 0.5 dtex or less, wherein the separator has a void rate of 65% to 85% and a maximum pore diameter of 0.9 μm to 6 μm.

2. The separator for an electrochemical device according to claim 1, wherein the fibrillated liquid crystalline polymeric fibers are fibrillated at least by means of a high-pressure homogenizer.

3. The separator for an electrochemical device according to claim 1, wherein the liquid crystalline polymeric fibers are totally aromatic polyamide fibers.

4. The separator for an electrochemical device according to claim 1, wherein the liquid crystalline polymeric fibers are totally aromatic polyester fibers.

5. The separator for an electrochemical device according to claim 1, which comprises fibrillated cellulose fibers in an amount of 8% or less.

6. The separator for an electrochemical device according to claim 1, which comprises bacterial cellulose in an amount of 8% or less.

7. The separator for an electrochemical device according to claim 1, which has Gurley air permeability of 0.5 s/100 ml to 20 s/100 ml.

8. The separator for an electrochemical device according to claim 1, which has an extract solution conductivity of 3.5 μS/cm to 30 μS/cm.

9. The separator for an electrochemical device according to claim 1, which has a center plane average surface roughness SRa of 1.7 μm to 20 μm.

10. The separator for an electrochemical device according to claim 1, which has tensile strength in a longitudinal direction of 1 kg/50 mm or more, and puncture strength of 100 g or more.

11. The separator for an electrochemical device according to claim 1, which has moisture absorption of lower than 5%, as measured after the separator was dried at any temperature of 150 C to 210 C for one hour or longer, and allowed to stand in an atmosphere of 20 C and 65% RH for 24 hours or longer.

12. The separator for an electrochemical device according to claim 1, which exhibits heat shrinkage degree of lower than 5%, as measured after being left in an atmosphere of 150 C to 210 C for one hour or longer.

13. The separator for an electrochemical device according to claim 1, which has a multi-layer structure.

14. The separator for an electrochemical device according to claim 1, which has a multi-layer structure comprising a relatively higher and lower density layers.

15. The separator for an electrochemical device according to claim 1, which is thermally treated at 150 C to 250 C.

16. The separator for an electrochemical device according to claim 1, wherein the wet nonwoven fabric is brought into contact with a roll heated to 150 C to 250 C for the thermal treatment.

17. A separator for an electric double layer capacitor which comprises the separator for an electrochemical device according to claim 1.

18. A method for producing a separator for an electrochemical device, which comprises a wet nonwoven fabric comprising one or more kinds of fibrillated liquid crystalline polymeric fibers which are at least partially fibrillated into a fiber diameter of 0.0004 μm to 1 μm, and having a melting point or a thermal decomposition temperature of 250 C to 650° C. and an average fiber length of 0.3 mm to 2 mm, one or more kinds of unfibrillated organic fibers having a fineness of 0.5 dtex or less, wherein the separator has a void rate of 65% to 85% and a maximum pore diameter of 0.9 μm to 6 μm, the method comprises preparing a stock slurry having a solid content of 0.001% to 0.5% and a conductivity of 30 μS/cm or less, and carrying out a wet paper-making method.

19. The method for producing a separator for an electrochemical device according to claim 18, wherein the paper-making is carried out by combining two or more layers.

20. The method for producing a separator for an electrochemical device according to claim 18, further comprising a thermal treatment at 150 C to 250 C.

* * * * *